US012328193B2

(12) United States Patent
Babaei

(10) Patent No.: US 12,328,193 B2
(45) Date of Patent: Jun. 10, 2025

(54) FEEDBACK ENHANCEMENT FOR MULTICAST BROADCAST SERVICES

(71) Applicant: TOYOTA JIDOSHA KABUSHIKI KAISHA, Toyota (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 18/029,548

(22) PCT Filed: Oct. 12, 2021

(86) PCT No.: PCT/JP2021/037718
§ 371 (c)(1),
(2) Date: Mar. 30, 2023

(87) PCT Pub. No.: WO2022/080362
PCT Pub. Date: Apr. 21, 2022

(65) Prior Publication Data
US 2023/0361926 A1    Nov. 9, 2023

Related U.S. Application Data

(60) Provisional application No. 63/090,409, filed on Oct. 12, 2020.

(51) Int. Cl.
*H04L 1/1812* (2023.01)
*H04L 5/00* (2006.01)
*H04W 76/27* (2018.01)

(52) U.S. Cl.
CPC .......... *H04L 1/1812* (2013.01); *H04L 5/0048* (2013.01); *H04W 76/27* (2018.02)

(58) Field of Classification Search
None
See application file for complete search history.

(56) References Cited

U.S. PATENT DOCUMENTS

2017/0041880 A1*  2/2017  Ouchi .................. H04L 5/0053
2017/0325277 A1   11/2017 Fujishiro et al.
2022/0078805 A1    3/2022  Yoshioka et al.

FOREIGN PATENT DOCUMENTS

WO    WO 2016/121567 A1    8/2016
WO    WO 2020/136854 A1    7/2020
WO    WO 2020/200603 A1   10/2020

OTHER PUBLICATIONS

ZTE et al., "Discussion on PHY Procedures for Sidelink", dated Apr. 2, 2019, 7 pages.
3rd Generation Partnership Project, "3GPP TS 38.321 V16.5.0", dated Jun. 2021 (including Section 5.3, 5.7, 5.15), pp. 1-157.
3rd Generation Partnership Project, "3GPP TS 38.214 V16.6.0", dated Jun. 2021 (including Section 5.1), pp. 1-172.

* cited by examiner

*Primary Examiner* — Guerrier Merant
(74) *Attorney, Agent, or Firm* — Finnegan, Henderson, Farabow, Garrett, and Dunner, LLP

(57) ABSTRACT

A system, method and apparatus for mobile communications is provided. A user equipment (UE) receives a multicast broadcast services (MBS) transport block, wherein the UE corresponds to a defined state. The defined state can be an RRC inactive or idle state. The UE determines determining to transmit a HARQ feedback for the received MBS transport block. The UE then transmits an indication of the HARQ feedback.

10 Claims, 24 Drawing Sheets

FIG. 3A

| Transport channel / Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3B

| Transport channel / Logical channel | UL-SCH | RACH |
|---|---|---|
| CCCH | X | |
| DCCH | X | |
| DTCH | X | |

FIG. 3C

| Transport channel / Logical channel | SL-BCH | SL-SCH |
|---|---|---|
| SBCCH | X | |
| SCCH | | X |
| STCH | | X |

FIG. 4A

| Physical channel / Transport channel | PDSCH | PDCCH | PBCH |
|---|---|---|---|
| BCH | | | X |
| PCH | X | | |
| DL-SCH | X | | |

FIG. 4B

| Physical channel / Transport channel | PUSCH | PUCCH | PRACH |
|---|---|---|---|
| UL-SCH | X | | |
| RACH | | | X |

FIG. 4C

| Physical channel / Transport channel | PSSCH | PSCCH | PSFCH | PSBCH |
|---|---|---|---|---|
| SL-BCH | | | | X |
| SL-SCH | X | | | |

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

FEEDBACK ENHANCEMENT FOR MULTICAST BROADCAST SERVICES

CROSS-REFERENCE TO RELATED APPLICATIONS

This application is a national stage of International Application No. PCT/JP2021/037718, filed Oct. 12, 2021, and is based upon and claims the benefit of priority from U.S. Patent Application No. 63/090,409 filed Oct. 12, 2020, the entire contents of which are incorporated herein by reference.

TECHNICAL FIELD

The disclosure relates to a method for hybrid automatic repeat request (HARQ) feedback transmission and a method for channel state information (CSI) feedback reporting.

BACKGROUND ART

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

SUMMARY OF INVENTION

In some embodiments of this disclosure, a method for hybrid automatic repeat request (HARQ) feedback transmission is provided. The method includes: receiving via a downlink data channel and from a base station, a multicast broadcast services (MBS) transport block; determining that a received power level of a reference signal is larger than a predetermined threshold; and transmitting a HARQ feedback associated with the received MBS transport block.

In some embodiments of this disclosure, a method for hybrid automatic repeat request (HARQ) feedback transmission is provided. The method includes: receiving, a multicast broadcast services (MBS) transport block, wherein the UE corresponds to a defined state; determining, by the UE, to transmit a HARQ feedback for the received MBS transport block; and based on whether the UE being in the defined state, transmitting the HARQ feedback using a random access process.

In some embodiments of this disclosure, a method for channel state information (CSI) feedback reporting is provided. The method includes: receiving via a downlink data channel, a logical control channel associated with multicast broadcast services (MBS), wherein the logical control channel carries control information comprising CSI configuration parameters for CSI measurement and CSI reports and wherein the CSI reports are associated with the MBS; measuring, by the UE, one or more reference signals based on the CSI configuration parameters; and transmitting the CSI reports based on the measured one or more reference signals and based on the CSI configuration parameters.

In some embodiments of this disclosure, a method for channel state information (CSI) feedback reporting is provided. The method includes: receiving CSI configuration parameters comprising: first CSI configuration parameters associated with multicast broadcast services (MBS); and second CSI configuration parameters associated with unicast services; measuring one or more first reference signals based on the first CSI configuration parameters; measuring one or more second reference signals based on the second CSI configuration parameters; transmitting a first CSI report, associated with one or more MBS, based on the measurement of the first reference signals; and transmitting a second CSI report, associated with one or more unicast services, based on the measurement of the second reference signals.

In some embodiments of this disclosure, an apparatus for a mobile communication network is provided. The apparatus includes: a memory storing instructions; and a processor configured to execute the instructions to: receive channel state information (CSI) configuration parameters comprising: first CSI configuration parameters associated with multicast broadcast services (MBS); and second CSI configuration parameters associated with unicast services; measure one or more first reference signals based on the first CSI configuration parameters; measure one or more second reference signals based on the second CSI configuration parameters; transmit a first CSI report, associated with one or more MBS, based on the measurement of the first reference signals; and transmit a second CSI report, associated with one or more unicast services, based on the measurement of the second reference signals.

In some embodiments of this disclosure, a system for mobile communication is provided. The system includes a base station configured to transmit, to a user equipment (UE), channel state information (CSI) configuration parameters comprising: first CSI configuration parameters associated with multicast broadcast services (MBS); and second CSI configuration parameters associated with unicast services; the UE that is configured to measure one or more first reference signals based on the first CSI configuration parameters and one or more second reference signals based on the second CSI configuration parameters.

In some embodiments of this disclosure, a non-transitory computer readable medium is provided. The non-transitory computer readable medium stores a set of instructions that is executable by at least one processor of an apparatus in a mobile communication system to perform a method. The method includes: receiving channel state information (CSI) configuration parameters comprising: first CSI configuration parameters associated with multicast broadcast services (MBS); and second CSI configuration parameters associated with unicast services; measuring one or more first reference signals based on the first CSI configuration parameters; measuring one or more second reference signals based on the second CSI configuration parameters; transmitting a first CSI report, associated with one or more MBS, based on the measurement of the first reference signals; and transmitting a second CSI report, associated with one or more unicast services, based on the measurement of the second reference signals.

In some embodiments of this disclosure, a non-transitory computer readable medium is provided. The non-transitory computer readable medium stores a set of instructions that is executable by at least one processor of an apparatus in a mobile communication system to perform a method. The method includes: transmitting channel state information (CSI) configuration parameters comprising: first CSI configuration parameters associated with multicast broadcast services (MBS); and second CSI configuration parameters associated with unicast services; wherein the UE is configured to measure one or more first reference signals based on the first CSI configuration parameters and measure one or more second reference signals based on the second CSI configuration parameters.

BRIEF DESCRIPTION OF DRAWINGS

FIG. 3A, FIG. 3B and FIG. 3C show example mappings between logical channels and transport channels in downlink, uplink and sidelink, respectively, according to some aspects of one or more exemplary embodiments of the present disclosure.

FIG. 4A, FIG. 4B and FIG. 4C show example mappings between transport channels and physical channels in downlink, uplink and sidelink, respectively, according to some aspects of one or more exemplary embodiments of the present disclosure.

FIG. 6 shows example physical signals in downlink, uplink and sidelink according to some aspects of one or more exemplary embodiments of the present disclosure.

DESCRIPTION OF EMBODIMENTS

The following disclosure provides many different embodiments, or examples, for implementing different features of the provided subject matter. Specific examples of arrangements are described below to simplify the present disclosure. These are merely examples and are not intended to be limiting.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
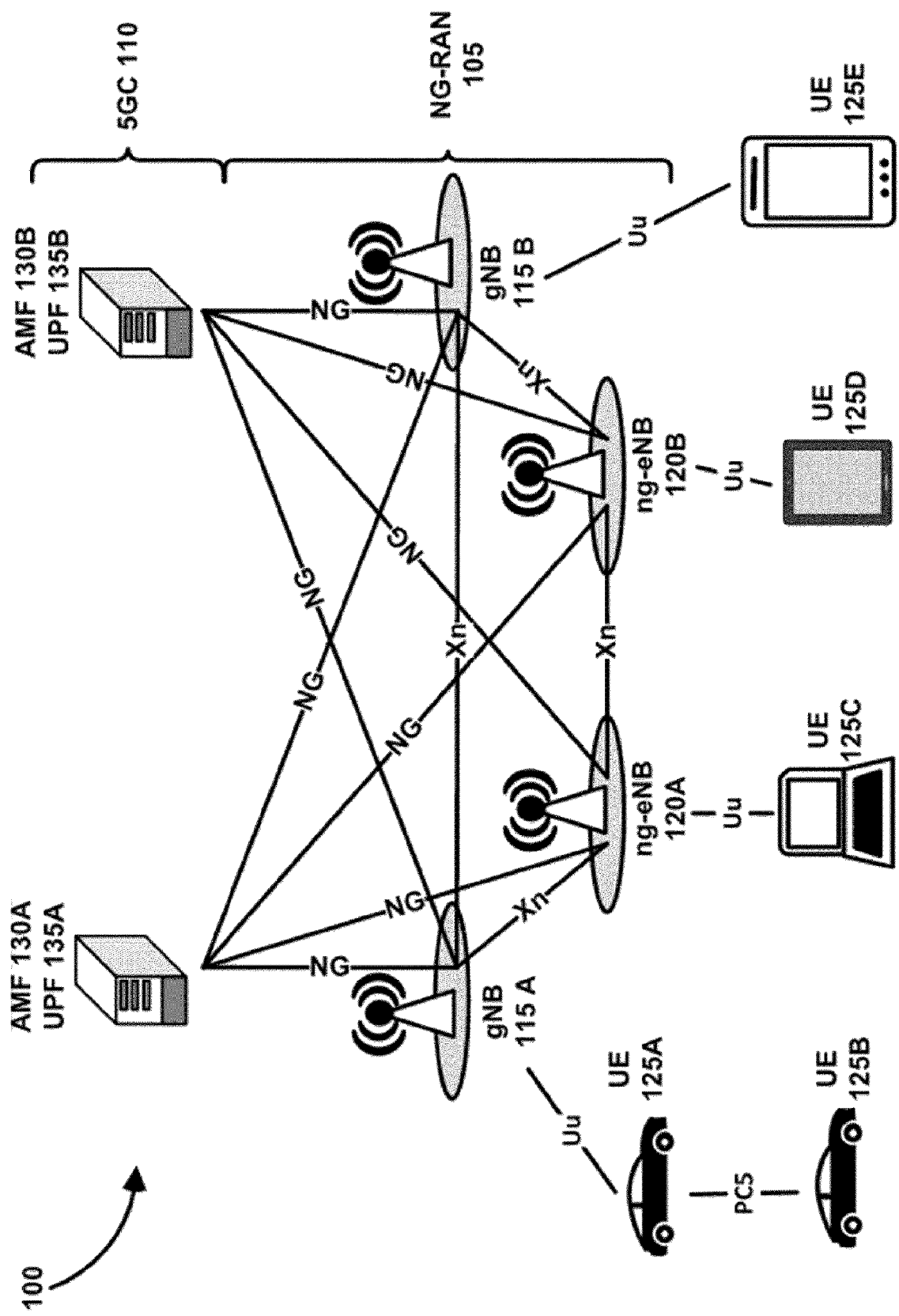
FIG. 1 shows an example of a system of mobile communications according to some aspects of one or more exemplary embodiments of the present disclosure.

FIG. 1 shows an example of a system of mobile communications 100 according to some aspects of one or more exemplary embodiments of the present disclosure. The system of mobile communication 100 may be operated by a wireless communications system operator such as a Mobile Network Operator (MNO), a private network operator, a Multiple System Operator (MSO), an Internet of Things (JOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial JOT (HOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 (e.g., UE 125A-UE 125E) and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UEs 125 and the RAN (e.g., the NG-RAN 105) may be referred to as Access Stratum (AS) and the functional layer between the UEs 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of the UEs 125 include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for the UEs 125 such as a Mobile Station (MS), terminal equipment, terminal node, client device, mobile device, etc. Still further, the UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of the NG-RAN 105 may be either a next generation Node B (gNB) 115 (e.g., gNB 115A, gNB 115B) or a next generation evolved Node B (ng-eNB) 120 (e.g., ng-eNB 120A, ng-eNB 120B). In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and General Packet Radio Service (GPRS) Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 (e.g., AMF 130A, AMF 130B) of the 5GC 110 by means of the NG-C interface and to a User Plane Function (UPF) 135 (e.g., UPF135A, UPF 135B) of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing and forwarding; Packet inspection and User plane part of Policy rule enforcement; Traffic usage reporting; Uplink classifier to support routing traffic flows to a data network; Branching point to support multihomed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the medium access control (MAC) layer into two-bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the MAC header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two-bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
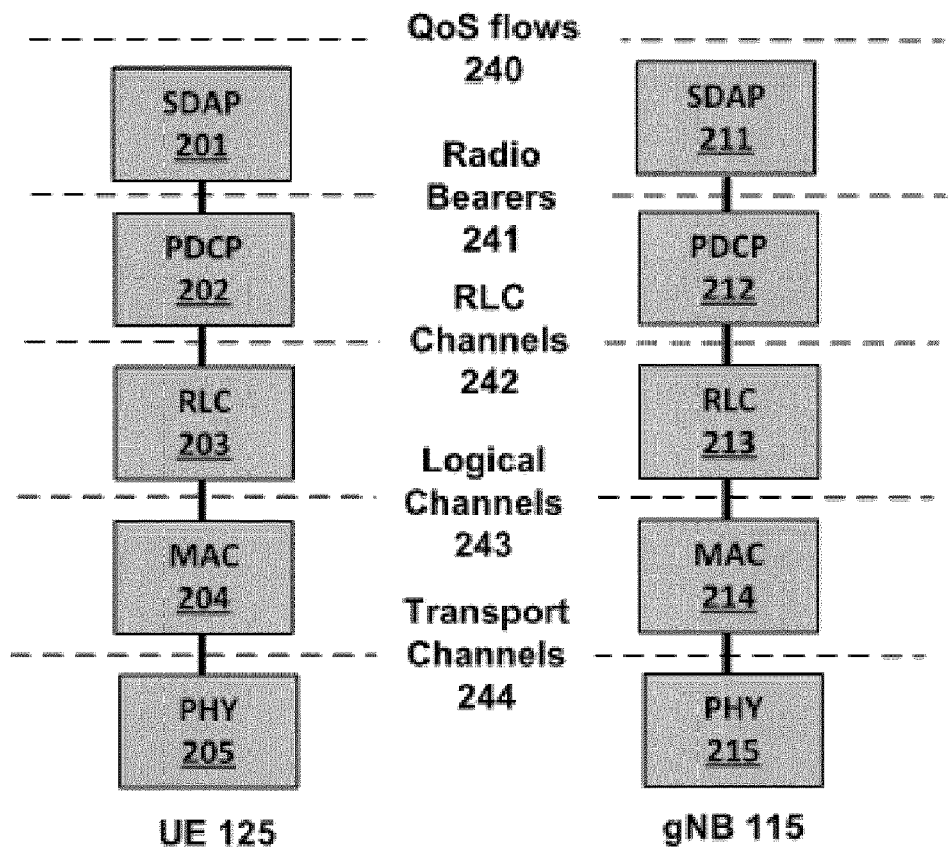
FIG. 2A and FIG. 2B show examples of radio protocol stacks for user plane and control plane, respectively, according to some aspects of one or more exemplary embodiments of the present disclosure.
Figure 2B:
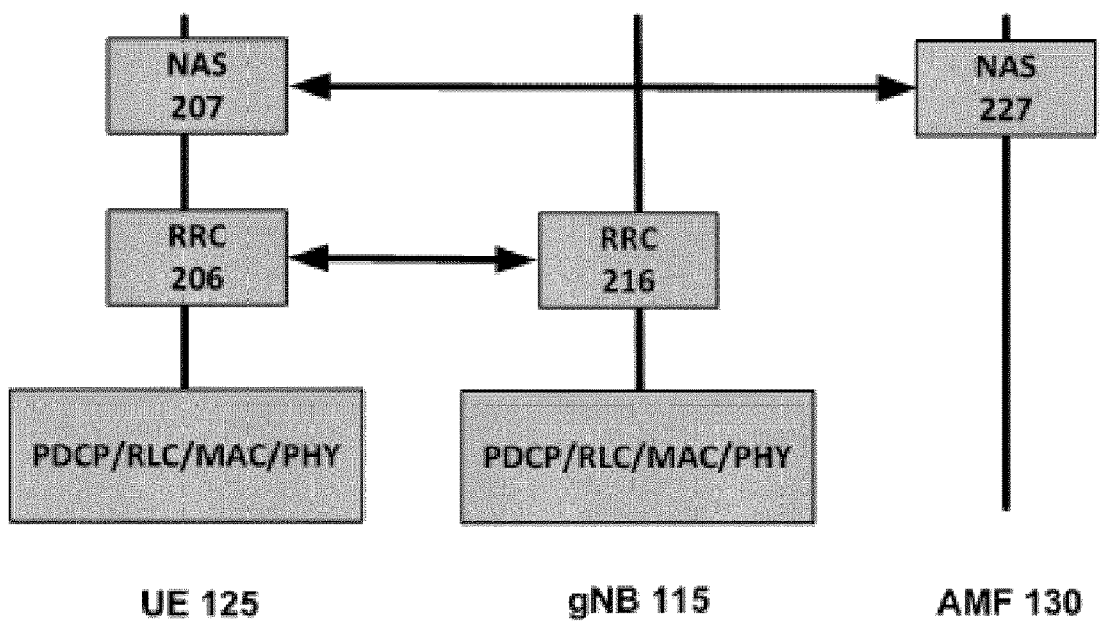

FIG. 2A and FIG. 2B show examples of radio protocol stacks for user plane and control plane, respectively, according to some aspects of one or more exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and resegmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of one or more exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DLSCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of one or more exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and Channel State Information (CSI) feedback triggers, etc. At least six Orthogonal Frequency Division Multiplexing (OFDM) symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figure 5A:
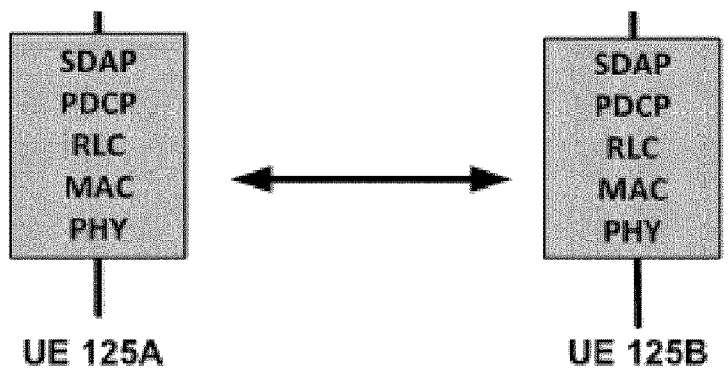
FIG. 5A, FIG. 5B, FIG. 5C and FIG. 5D show examples of radio protocol stacks for NR sidelink communication according to some aspects of one or more exemplary embodiments of the present disclosure.
Figure 5B:
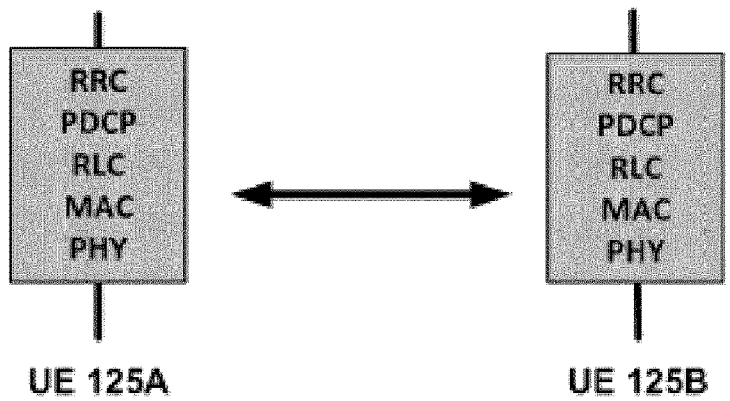
Figure 5C:
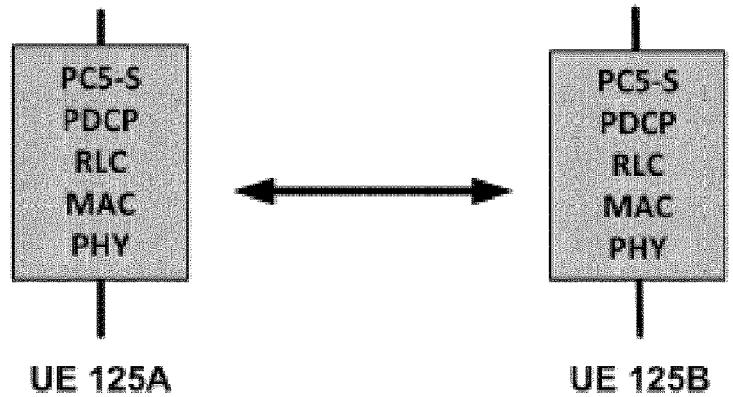
Figure 5D:
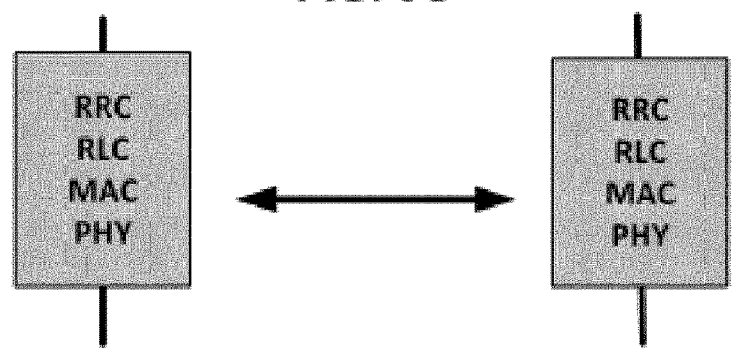

FIG. 5A, FIG. 5B, FIG. 5C and FIG. 5D show examples of radio protocol stacks for NR sidelink communication according to some aspects of one or more exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of one or more exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC control element (CE). The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
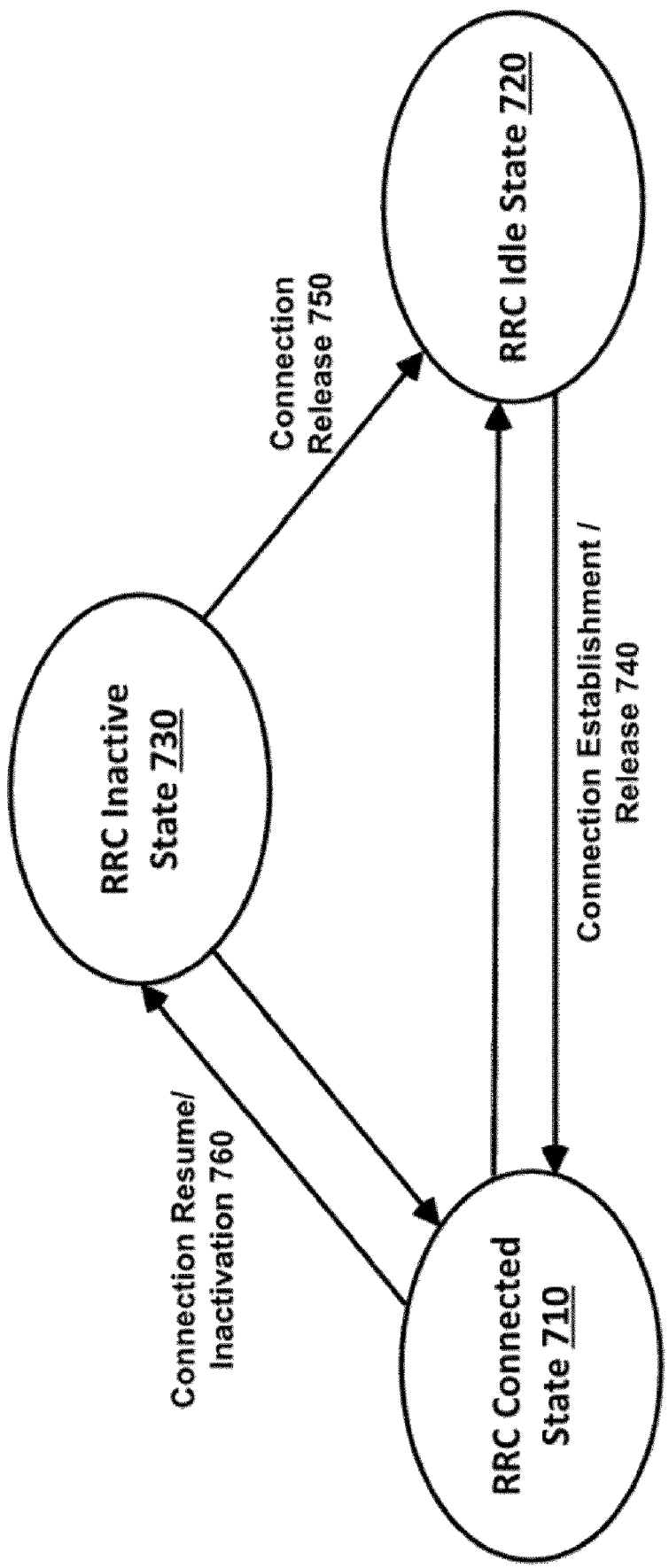
FIG. 7 shows examples of Radio Resource Control (RRC) states and transitioning between different RRC states according to some aspects of one or more exemplary embodiments of the present disclosure.

FIG. 7 shows examples of Radio Resource Control (RRC) states and transitioning between different RRC states according to some aspects of one or more exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
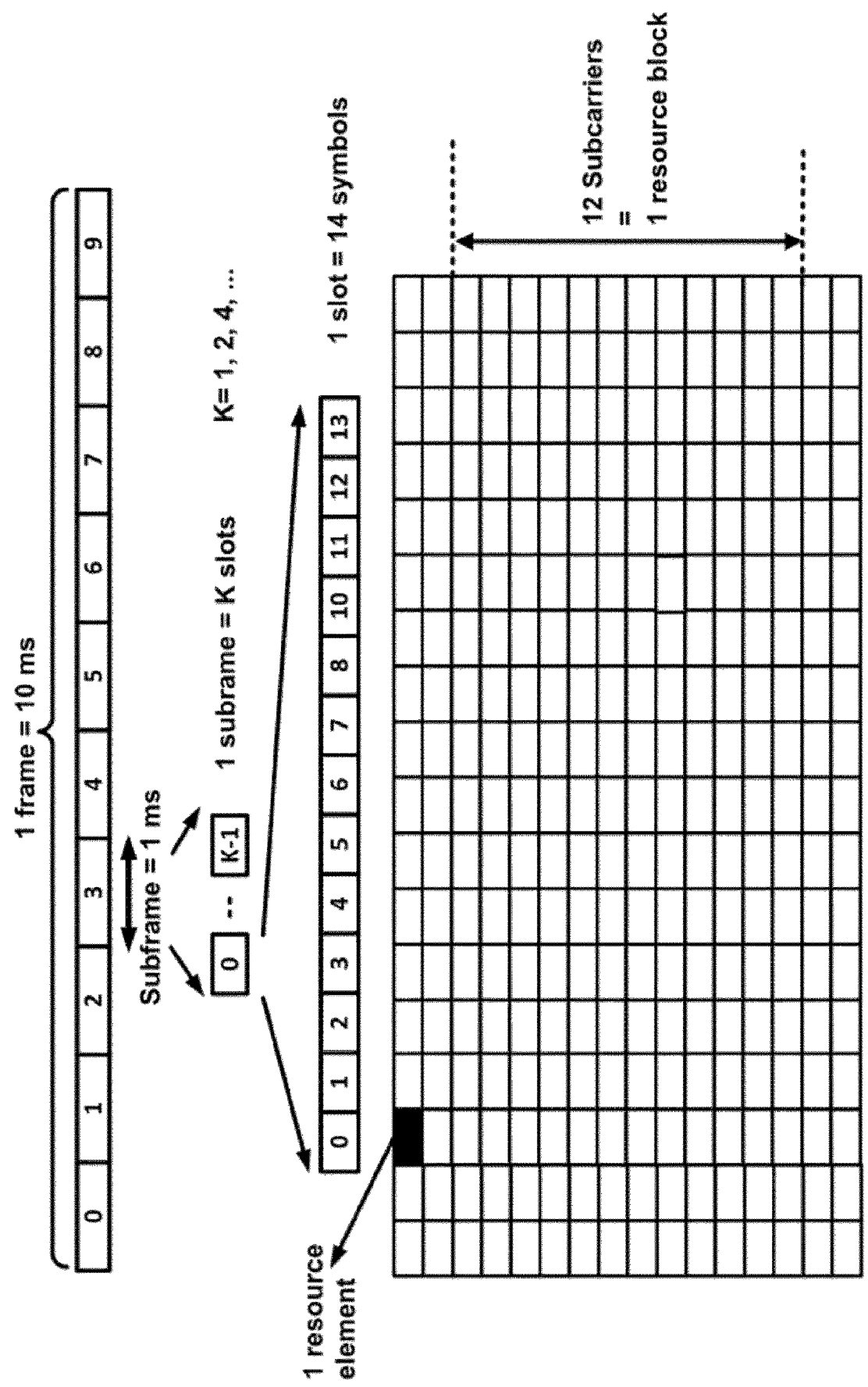
FIG. 8 shows example frame structure and physical resources according to some aspects of one or more exemplary embodiments of the present disclosure.

FIG. 8 shows example frame structure and physical resources according to some aspects of one or more exemplary embodiments of the present disclosure. The downlink or uplink or sidelink transmissions may be organized into frames with 10 ms duration, consisting of ten (0 to 9) 1 ms subframes. Each subframe may consist of k slots (k=1, 2, 4, . . . ), wherein the number of slots k per subframe may depend on the subcarrier spacing of the carrier on which the transmission takes place. The slot duration may be 14 (0 to 13) symbols with Normal Cyclic Prefix (CP) and 12 symbols with Extended CP and may scale in time as a function of the used sub-carrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example, during two, four, or seven OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
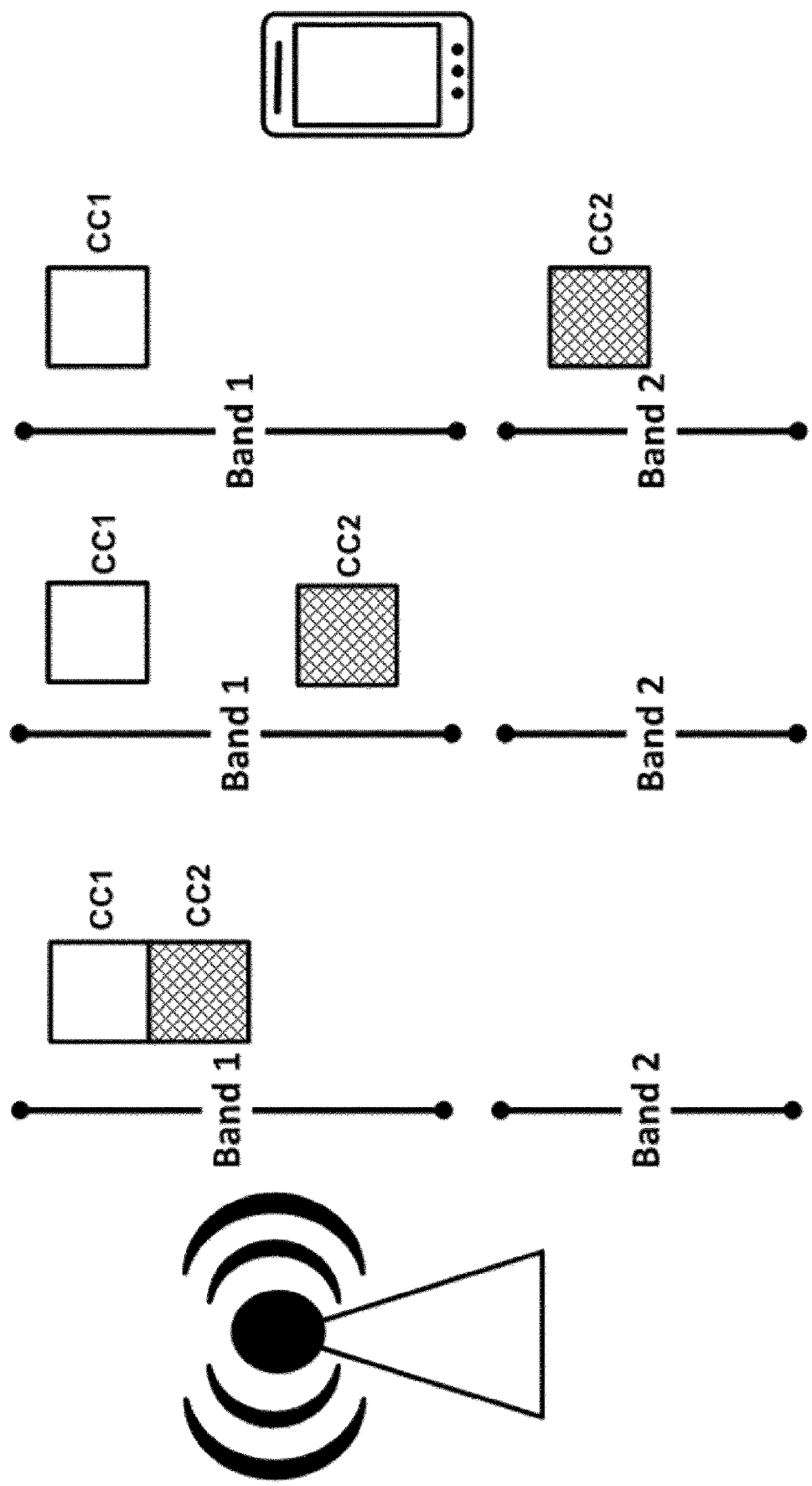
FIG. 9 shows example component carrier configurations in different carrier aggregation scenarios according to some aspects of one or more exemplary embodiments of the present disclosure.

FIG. 9 shows example component carrier configurations in different carrier aggregation scenarios according to some aspects of one or more exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
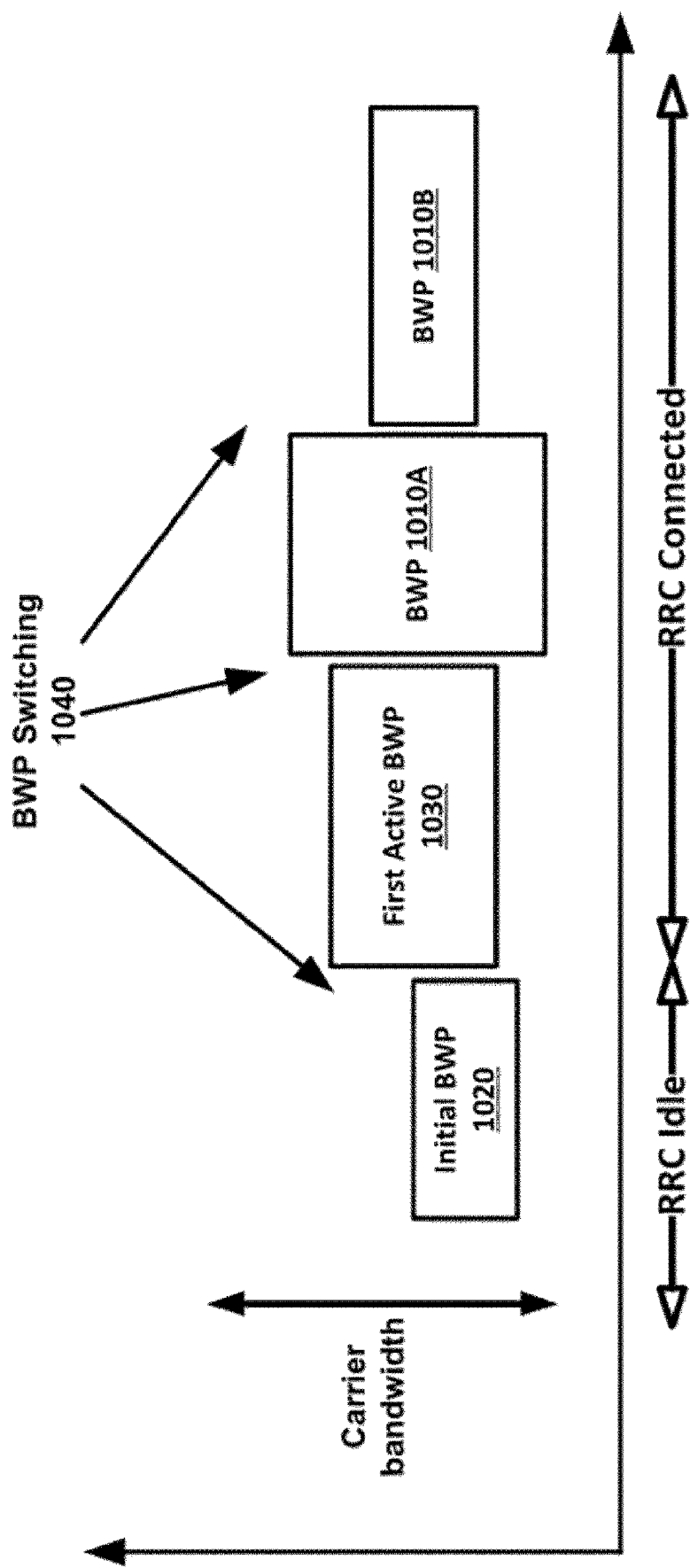
FIG. 10 shows example bandwidth part configuration and switching according to some aspects of one or more exemplary embodiments of the present disclosure.

FIG. 10 shows example bandwidth part configuration and switching according to some aspects of one or more exemplary embodiments of the present disclosure. The UE may be configured with one or more Bandwidth Parts (BWPs) 1010 (e.g., 1010A, 1010B) on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example, through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g., to allow different services). The first active BWP 1030 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
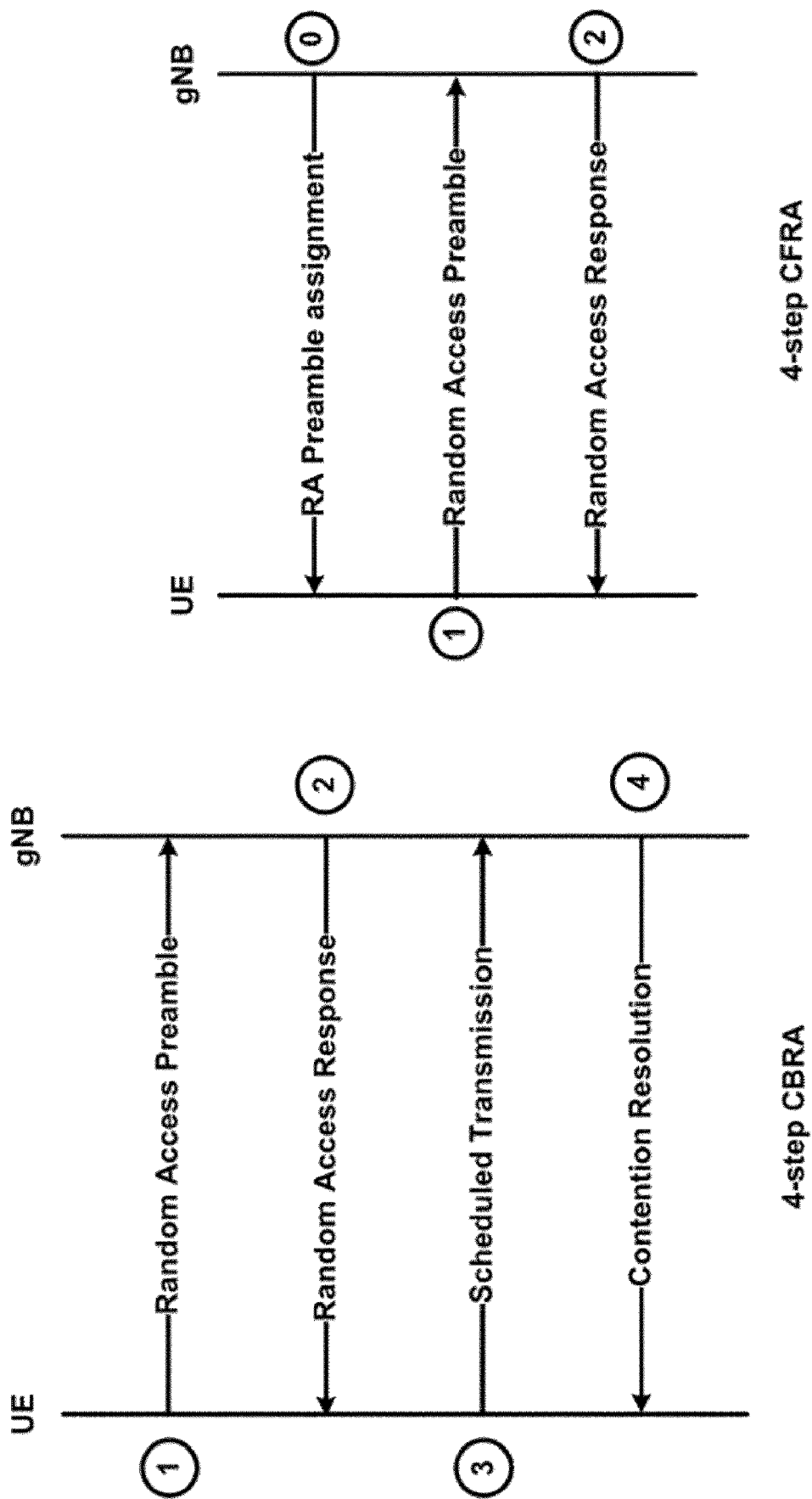
FIG. 11 shows example four-step contention-based and contention-free random access processes according to some aspects of one or more exemplary embodiments of the present disclosure.
Figure 12:
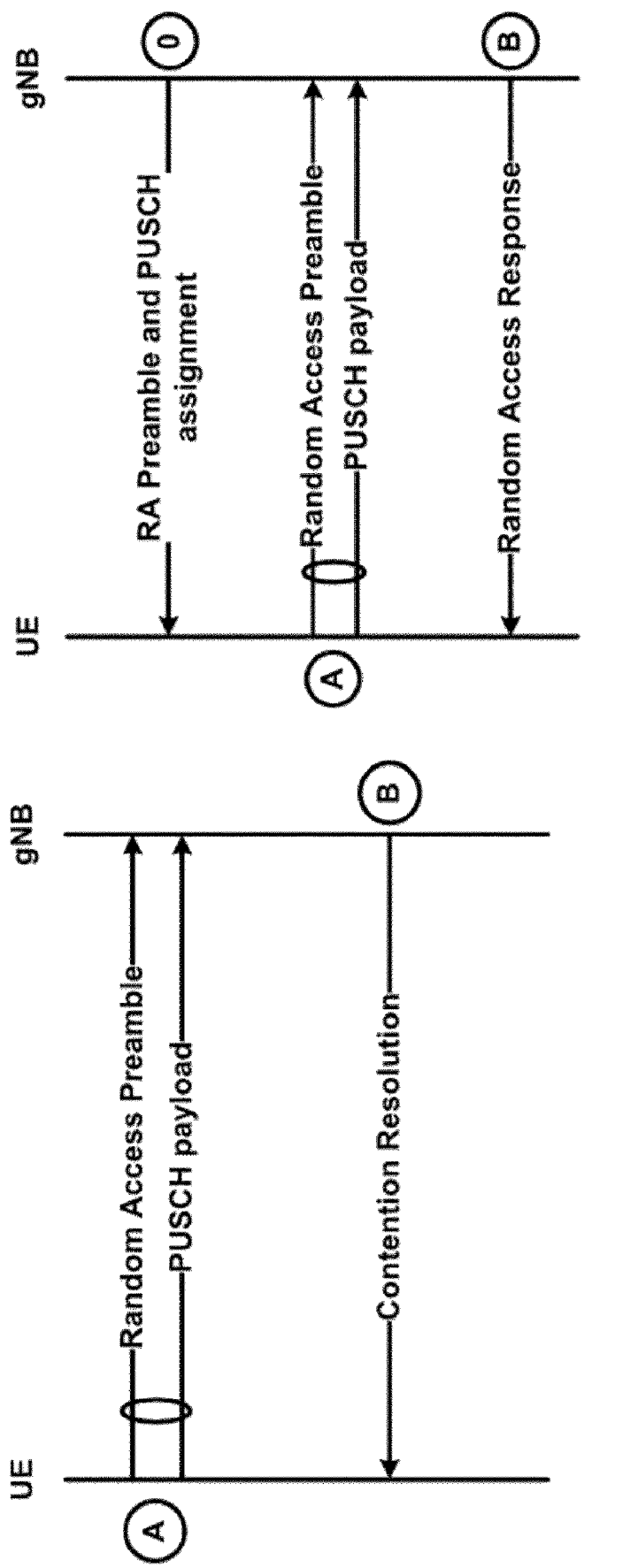
FIG. 12 shows example two-step contention-based and contention-free random access processes according to some aspects of one or more exemplary embodiments of the present disclosure.

FIG. 11 shows example four-step contention-based random access (CBRA) and contention-free random access (CFRA) processes according to some aspects of one or more exemplary embodiments of the present disclosure. FIG. 12 shows example two-step contention-based random access (CBRA) and contention-free random access (CFRA) processes according to some aspects of one or more exemplary embodiments of the present disclosure. The random access procedure may be triggered by a number of events, for example: Initial access from RRC Idle State; RRC Connection Reestablishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g., handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH (Step 1 of CBRA in FIG. 11). After MSG1 transmission, the UE may monitor for a response from the network within a configured window (Step 2 of CBRA in FIG. 11). For CFRA, dedicated preamble for MSG1 transmission may be assigned by the network (Step 0 of CFRA of FIG. 11) and upon receiving Random Access Response (RAR) from the network, the UE may end the random access procedure as shown in FIG. 11 (Steps 1 and 2 of CFRA in FIG. 11). For CBRA, upon reception of the random access response (Step 2 of CBRA in FIG. 11), the UE may send MSG3 using the uplink grant scheduled in the random access response (Step 3 of CBRA in FIG. 11) and may monitor contention resolution as shown in FIG. 11 (Step 4 of CBRA in FIG. 11). If contention resolution is not successful after MSG3 (re)transmission(s), the UE may go back to MSG1 transmission.

The MSGA of the 2-step RA type may include a preamble on PRACH and a payload on PUSCH (e.g., Step A of CBRA in FIG. 12). After MSGA transmission, the UE may monitor for a response from the network within a configured window. For CFRA, dedicated preamble and PUSCH resource may be configured for MSGA transmission (Steps 0 and A of CFRA in FIG. 12) and upon receiving the network response (Step B of CFRA in FIG. 12), the UE may end the random access procedure as shown in FIG. 12. For CBRA, if contention resolution is successful upon receiving the network response (Step B of CBRA in FIG. 12), the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
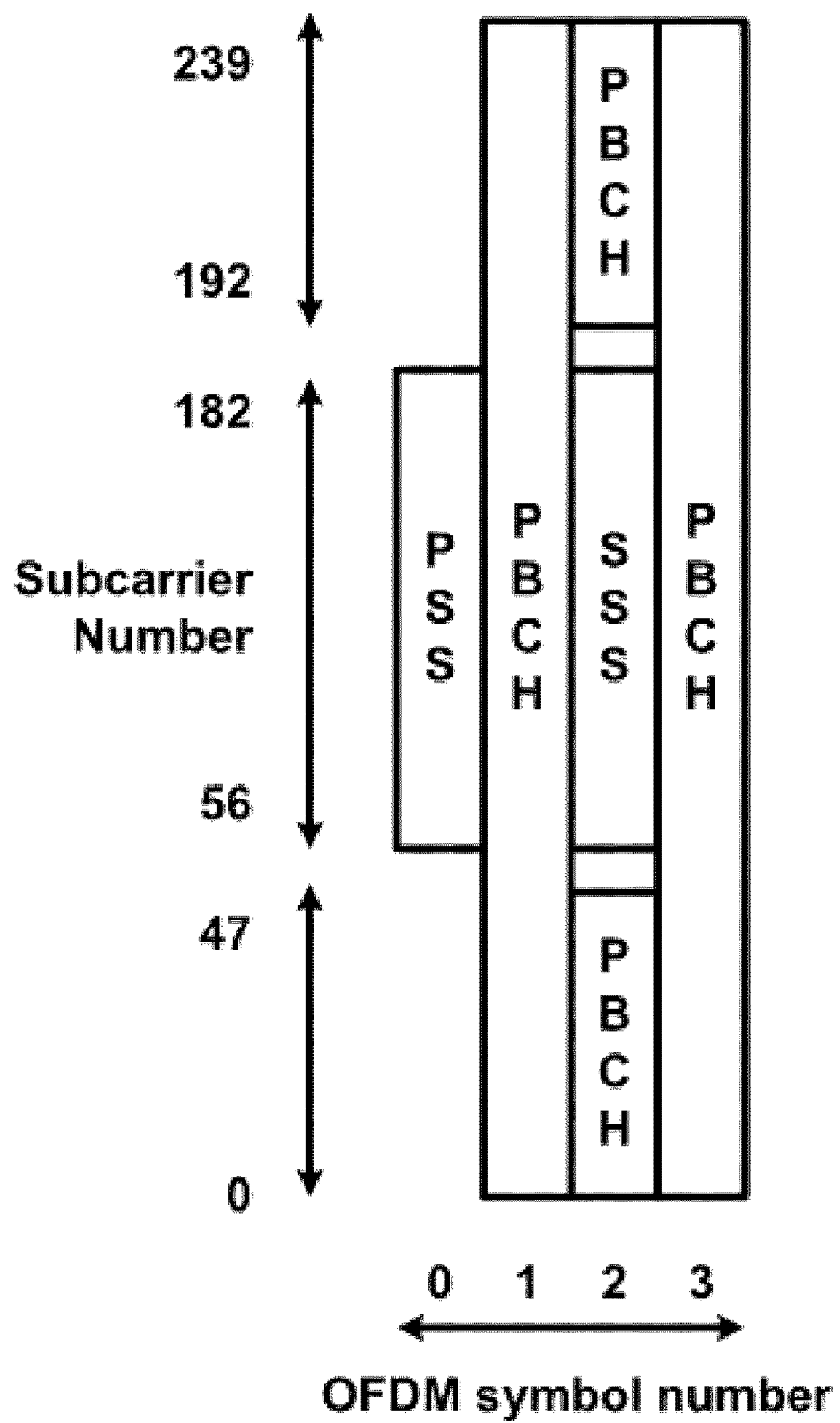
FIG. 13 shows example time and frequency structure of Synchronization Signal and Physical Broadcast Channel (PBCH) Block (SSB) according to some aspects of one or more exemplary embodiments of the present disclosure.

FIG. 13 shows example time and frequency structure of Synchronization Signal and Physical Broadcast Channel (PBCH) Block (SSB) according to some aspects of one or more exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB 1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
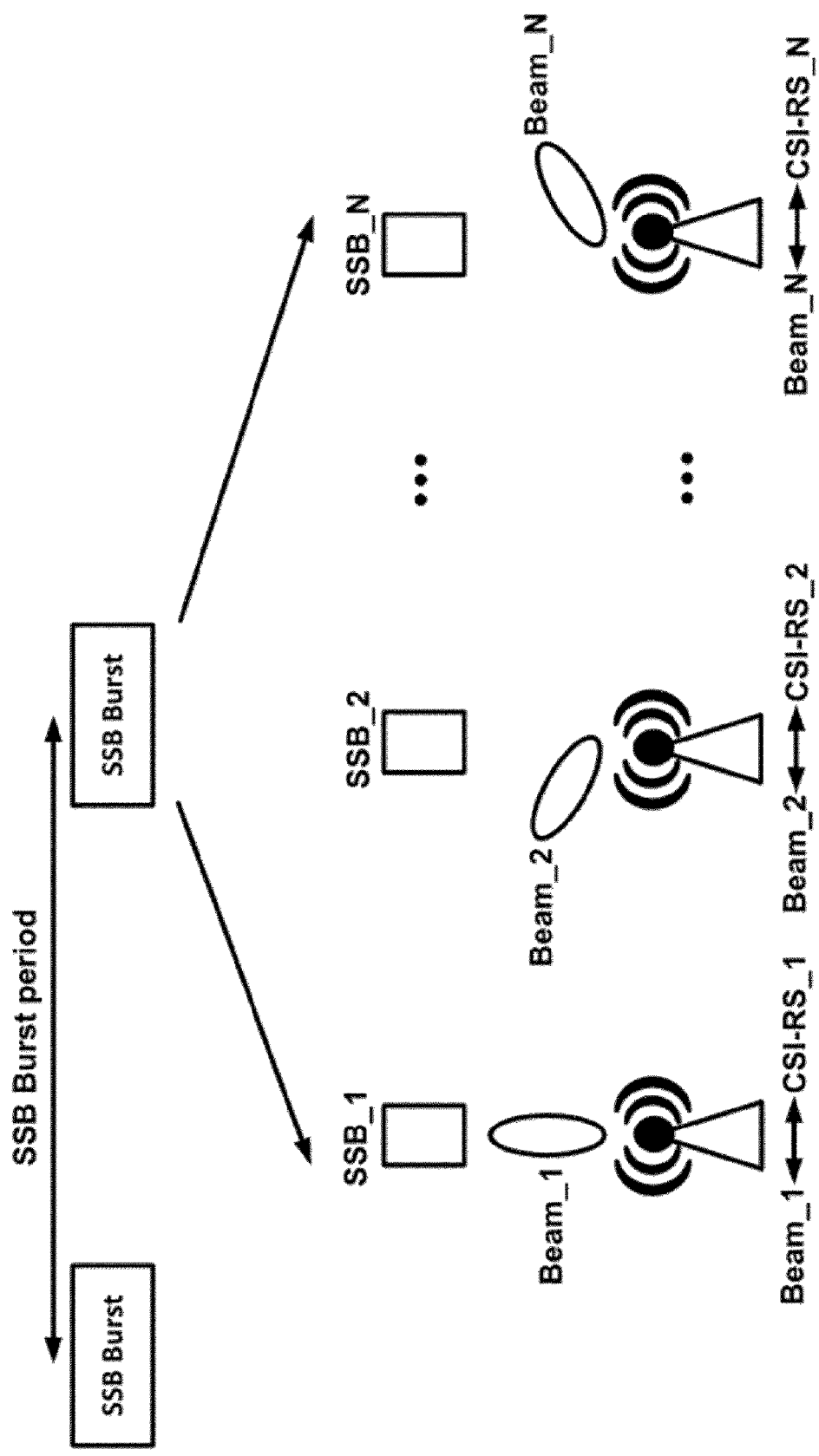
FIG. 14 shows example SSB burst transmissions according to some aspects of one or more exemplary embodiments of the present disclosure.

FIG. 14 shows example SSB burst transmissions according to some aspects of one or more exemplary embodiments of the present disclosure. An SSB burst may include N SSBs (e.g., SSB_1, SSB_2, . . . , SSB_N) and each SSB of the N SSBs may correspond to a beam (e.g., Beam_1, Beam_2, . . . , Beam_N). The SSB bursts may be transmitted according to a periodicity (e.g., SSB burst period). During a contention-based random access process, a UE may perform a random access resource selection process, wherein the UE first selects an SSB before selecting an RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource (e.g., CSI-RS_1, CSI-RS_2, . . . , CSI-RS_N). A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depend on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
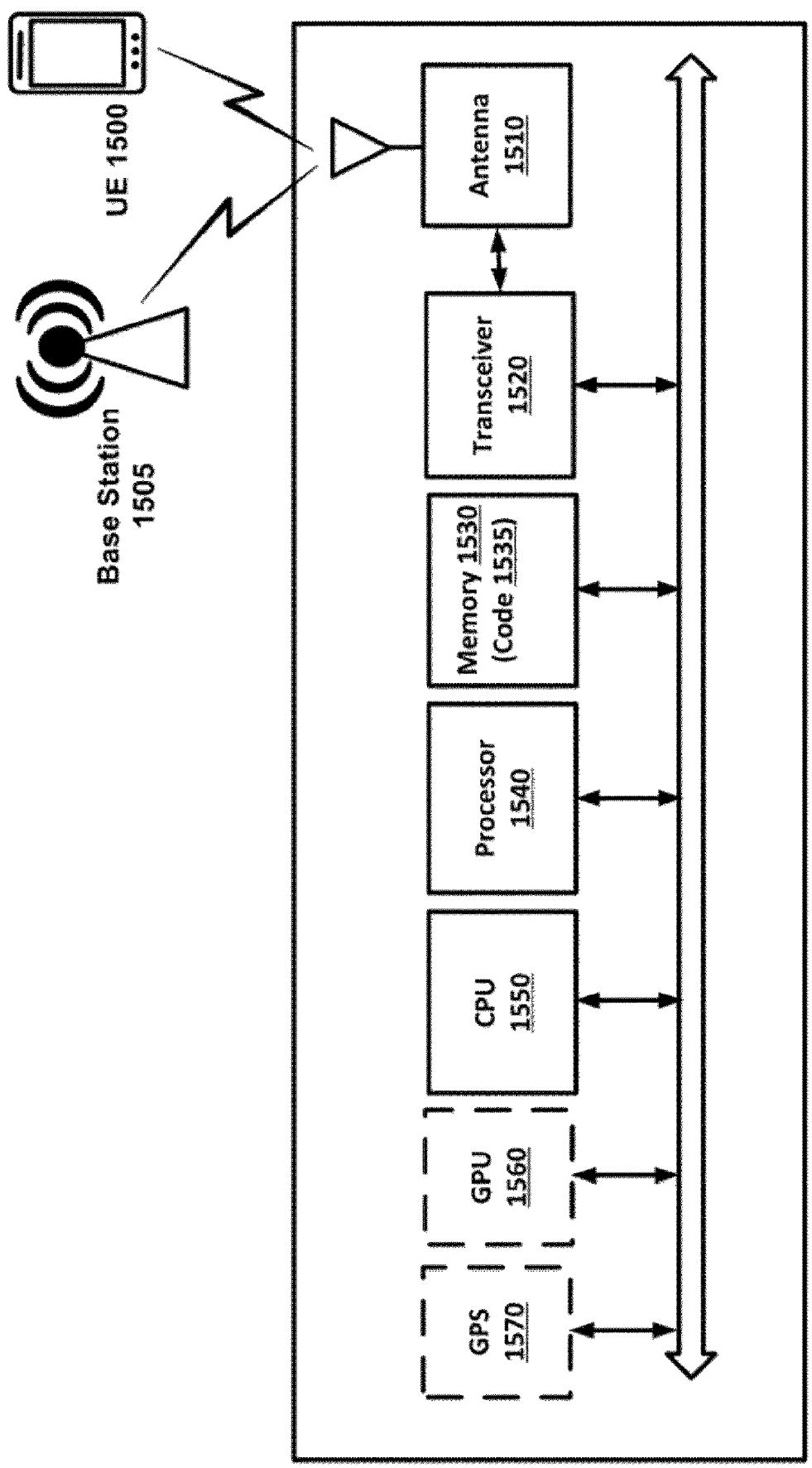
FIG. 15 shows example components of a user equipment and a base station for transmission and/or reception according to some aspects of one or more exemplary embodiments of the present disclosure.

FIG. 15 shows example components of a user equipment and a base station for transmission and/or reception according to some aspects of one or more exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment (UE) 1500. Accordingly, the components illustrated in FIG. 15 are not necessarily limited to either a UE or base station.

With reference to FIG. 15, the Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1510 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antenna 1510 for transmission, and to demodulate packets received from the Antenna 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The CPU 1550 may perform basic arithmetic, logic, controlling, and Input/output (I/O) operations specified by the computer instructions in the Memory 1530. The UE 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the UE 1500 and/or the base station 1505. The GPS 1570 may be used for enabling location-based services or other services for example based on geographical position of the UE 1500.

In some examples, the UE 1500 (apparatus) may be configured to or programmed for channel state information (CSI) report transmission in a mobile communication network. The UE 1500 may include a memory (e.g., memory 1530 of FIG. 15) storing instructions (e.g., code 1535 of FIG. 15) and a processor (e.g., processor 1540 of FIG. 15) configured to execute the instructions to receive CSI configuration parameters. The CSI configuration parameters may include first CSI configuration parameters associated with multicast broadcast services (MBS), and second CSI configuration parameters associated with unicast services. The processor is further configured to execute the instructions to measure one or more first reference signals based on the first CSI configuration parameters, measure one or more second reference signals based on the second CSI configuration parameters, transmit a first CSI report, associated with one or more MBS, based on the measurement of the first reference signals, and transmit a second CSI report, associated with one or more unicast services, based on the measurement of the second reference signals. In these examples, the memory of the UE 1500 (e.g., memory 1530) may store computer program codes (e.g., code 1535) that are executable by a processor (e.g., CPU 1550) to perform the functions of the UE 1500.

In some examples, the base station 1505 may be configured to or programmed for CSI report transmission in a mobile communication network. The base station 1505 may include a memory (e.g., memory 1530 of FIG. 15) storing instructions (e.g., code 1535 of FIG. 15), and a processor (e.g., processor 1540 of FIG. 15) configured to execute the instructions to transmit, to a UE (e.g., UE 1500), CSI configuration parameters. The CSI configuration parameters may include first CSI configuration parameters associated with MBS, and second CSI configuration parameters associated with unicast services. The UE may be configured to measure one or more first reference signals based on the first CSI configuration parameters and measure one or more second reference signals based on the second CSI configuration parameters. The processor may be configured to execute the instructions to transmit a downlink control information indicating a request for transmission of at least one of a first CSI report or a second CSI report. The downlink control information may trigger the UE to generate and/or transmit at least one of the first CSI report or the second CSI report. In these examples, the memory of the base station 1505 (e.g., memory 1530) may store computer program codes (e.g., code 1535) that are executable by a processor (e.g., CPU 1550) to perform the functions of the base station 1505.

In some examples, the UE 1500 and the base station 1505 are included in a system for mobile communication. The base station may be configured to or programmed to transmit, to the UE, CSI configuration parameters. The CSI configuration parameters may include first CSI configuration parameters associated with MBS, and second CSI configuration parameters associated with unicast services. In this system, the UE may be configured to or programmed to measure one or more first reference signals based on the first CSI configuration parameters and one or more second reference signals based on the second CSI configuration parameters.

In some examples, MBS services may be enabled via single-cell transmission. MBS may be transmitted in the coverage of a single cell. One or more Multicast/Broadcast control channels (e.g., MCCHs) and one or more Multicast/Broadcast data channels (e.g., MTCHs) may be mapped on DL-SCH. The scheduling may be done by the gNB. The Multicast/Broadcast control channel and the Multicast/Broadcast data channel transmissions may be indicated by a logical channel specific RNTI on PDCCH. In some examples, a one-to-one mapping between a service identifier such as a temporary mobile group identifier (TMGI) and a RAN level identifier such as a group identifier (G-RNTI) may be used for the reception of the DL-SCH to which a Multicast/Broadcast data channel may be mapped. In some examples, a single transmission may be used for DL-SCH associated with the Multicast/Broadcast control channel and/or the Multicast/Broadcast data channel transmissions and HARQ or RLC retransmissions may not be used and/or an RLC Unacknowledged Mode (RLC UM) may be used. In other examples some feedback (e.g., HARQ feedback or RLC feedback) may be used for transmissions via Multicast/Broadcast control channel and/or Multicast/Broadcast data channels.

In some examples, for Multicast/Broadcast data channel, the following scheduling information may be provided on Multicast/Broadcast control channel: a Multicast/Broadcast data channel scheduling cycle, a Multicast/Broadcast data channel onduration (e.g., duration that the UE waits for, after waking up from DRX, to receive PDCCHs), a Multicast/Broadcast data channel inactivity timer (e.g., duration that the UE waits to successfully decode a PDCCH, from the last successful decoding of a PDCCH indicating the DL-SCH to which this Multicast/Broadcast data channel is mapped, failing which it re-enters DRX).

In some examples, one or more UE identities may be related to MBS transmissions. The one or more identities may comprise at least one of: one or more first RNTIs that identify transmissions of the Multicast/Broadcast control channel; one or more second RNTIs that identify transmissions of a Multicast/Broadcast data channels. The one or more first RNTIs that identify transmissions of the Multicast/Broadcast control channel may comprise a single cell RNTI (SC-RNTI, other names may be used). The one or more second RNTIs that identify transmissions of a Multicast/Broadcast data channels may comprise a G-RNTI (nG-RNTI or other names may be used).

In some examples, one or more logical channels may be related to MBS transmissions. The one or more logical channels may comprise a Multicast/Broadcast control channel. The Multicast/Broadcast control channel may be a point-to-multipoint downlink channel used for transmitting MBS control information from the network to the UE, for one or several Multicast/Broadcast data channel. This channel may be used by UEs that receive or are interested to receive MBS. The one or more logical channels may comprise a Multicast/Broadcast data channel. This channel may be a point-to-multipoint downlink channel for transmitting MBS traffic data from the network.

Figure 16:
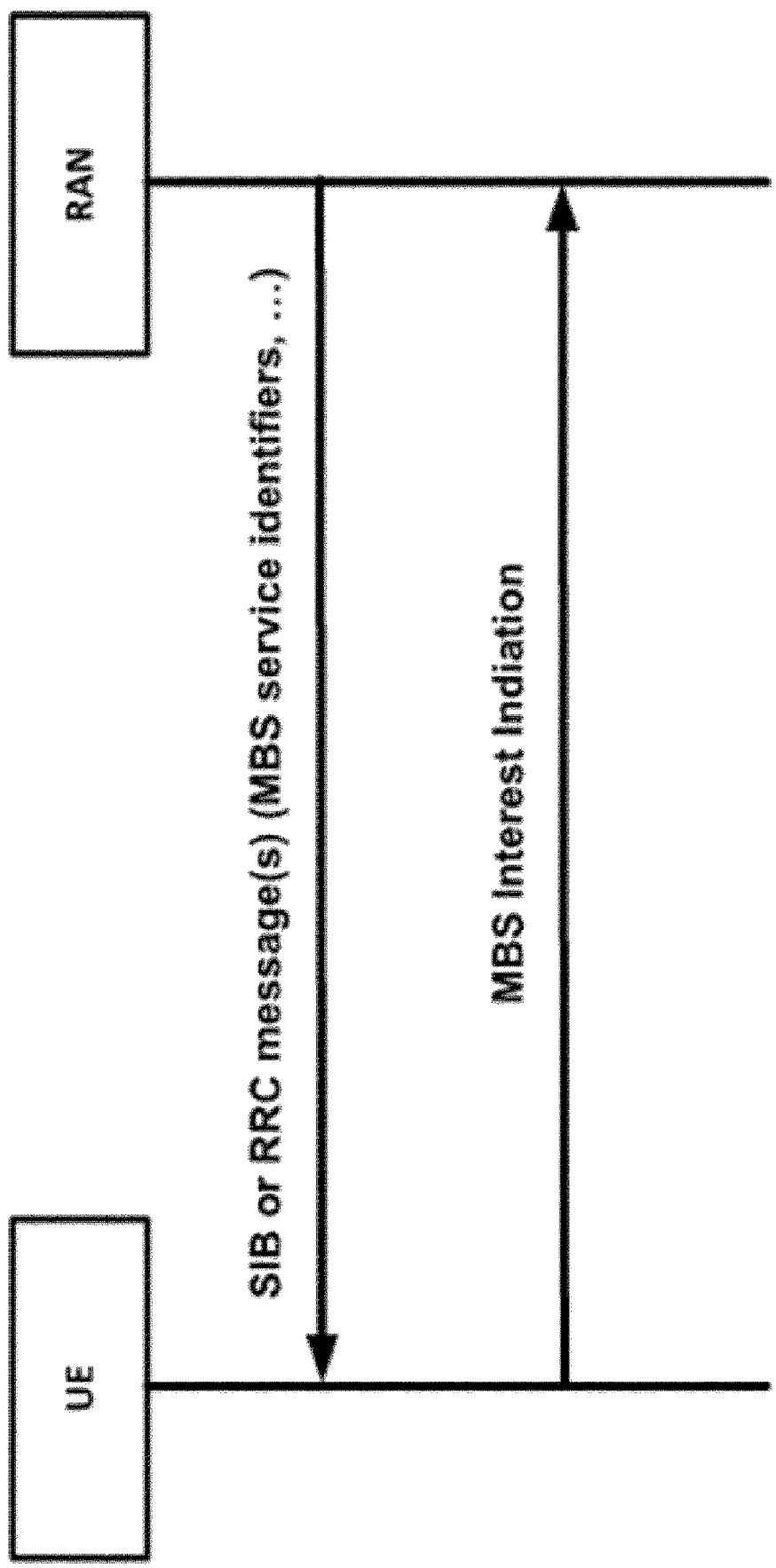
FIG. 16 shows an example process according to some aspects of one or more exemplary embodiments of the present disclosure.

In some examples, a procedure may be used by the UE to inform RAN that the UE is receiving or is interested to receive MBS service(s) via an MBS radio bearer, and if so, to inform the 5G RAN about the priority of MBS versus unicast reception or MBS service(s) reception in receive only mode. An example is shown in FIG. 16. The UE may transmit a message (e.g., an MBS interest indication message) message to inform RAN that the UE is receiving/interested to receive or no longer receiving/interested to receive MBS service(s). The UE may transmit the message based on receiving one or more messages (e.g., a SIB message or a unicast RRC message) from the network for example indicating one or more MBS Service Area Identifiers of the current and/or neighboring carrier frequencies.

In some examples, the UE may consider an MBS service to be part of the MBS services of interest if the UE is capable of receiving MBS services (e.g., via a single cell point to multipoint mechanism); and/or the UE is receiving or interested to receive this service via a bearer associated with MBS services; and/or one session of this service is ongoing or about to start; and/or at least one of the one or more MBS service identifiers indicated by network is of interest to the UE.

In some examples, control information for reception of MBS services may be provided on a specific logical channel: (e.g., a MCCH). The MCCH may carry one or more configuration messages which indicate the MBS sessions that are ongoing as well as the (corresponding) information on when each session may be scheduled, e.g., scheduling period, scheduling window and start offset. The one or more configuration messages may provide information about the neighbor cells transmitting the MBS sessions which may be ongoing on the current cell. In some examples, the UE may receive a single MBS service at a time, or more than one MBS services in parallel.

In some example, the MCCH information (e.g., the information transmitted in messages sent over the MCCH) may be transmitted periodically, using a configurable repetition period. The MCCH transmissions (and the associated radio resources and MCS) may be indicated on PDCCH.

In some examples, change of MCCH information may occur at specific radio frames/subframes/slots and/or a modification period may be used. For example, within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by a SIB or by RRC signaling.

In some examples, when the network changes (some of) the MCCH information, it may notify the UEs about the change in the first subframe/slot which may be used for MCCH transmission in a repetition period. Upon receiving a change notification, a UE interested to receive MBS services may acquire the new MCCH information starting from the same subframe/slot. The UE may apply the previously acquired MCCH information until the UE acquires the new MCCH information.

In an example, a system information block (SIB) may contain the information required to acquire the control information associated transmission of MBS. The information may comprise at least one of: one or more discontinuous reception (DRX) parameters for monitoring for scheduling information of the control information associated transmission of MBS, scheduling periodicity and offset for scheduling information of the control information associated transmission of MBS, modification period for modification of content of the control information associated transmission of MBS, repetition information for repetition of the control information associated transmission of MBS, etc.

In an example, an information element (IE) may provide configuration parameters indicating, for example, the list of ongoing MBS sessions transmitted via one or more bearers for each MBS session, one or more associated RNTIs (e.g., G-RNTI, other names may be used) and scheduling information. The configuration parameters may comprise at least one of: one or more timer values for discontinuous reception (DRX) (e.g., an inactivity timer or an On Duration timer), an RNTI for scrambling the scheduling and transmission of a Multicast/Broadcast traffic channel (e.g., MTCH, other names may be used), ongoing MBS session, one or more power control parameters, one or more scheduling periodicity and/or offset values for one or more MBS traffic channels, information about list of neighbor cells, etc.

Example embodiments may enable RAN functions for broadcast/multicast for UEs in RRC_CONNECTED state, RRC_IDLE state and RRC_INACTIVE state. A group scheduling mechanism may be used to allow UEs to receive Broadcast/Multicast service. In some example, Broadcast/Multicast service may be enabled to simultaneously operate with unicast reception. In some example, Broadcast/Multicast service delivery may be dynamically changed between multicast (PTM) and unicast (PTP) with service continuity for a given UE. In some examples, a coordination function may reside in the gNB-CU. In some examples, reliability of Broadcast/Multicast service may be improved by UL feedback. The level of reliability may be based on the requirements of the application/service provided. In some examples, the Broadcast/Multicast transmission area may be dynamically controlled within one gNBDU.

In some examples, Multicast and Broadcast Service (MBS) services may be provided using a point to multi-point (PTM), e.g., a single cell point to multi-point (SC-PTM) framework. The SC-PTM framework may also be used for one or more of Mission Critical Push-to-Talk (MCPTT), Internet of Things (IoT), and Vehicle-to-everything (V2X) communications. In some examples of a single cell point to multi-point framework, a gNB may use the physical downlink shared channel (PDSCH) to send broadcast data and control information to a group of UEs via one or more cells. In some examples, data of an MBS service may be sent on the PDSCH using a first RNTI, e.g., a group-specific Radio Network Temporary Identifier (e.g., a G-RNTI), and the control information associated with the MBS service may be sent on the PDSCH using a second RNTI, e.g., a single cell point to multi-point radio network temporary identifier (e.g., a SC-RNTI).

Figure 17:
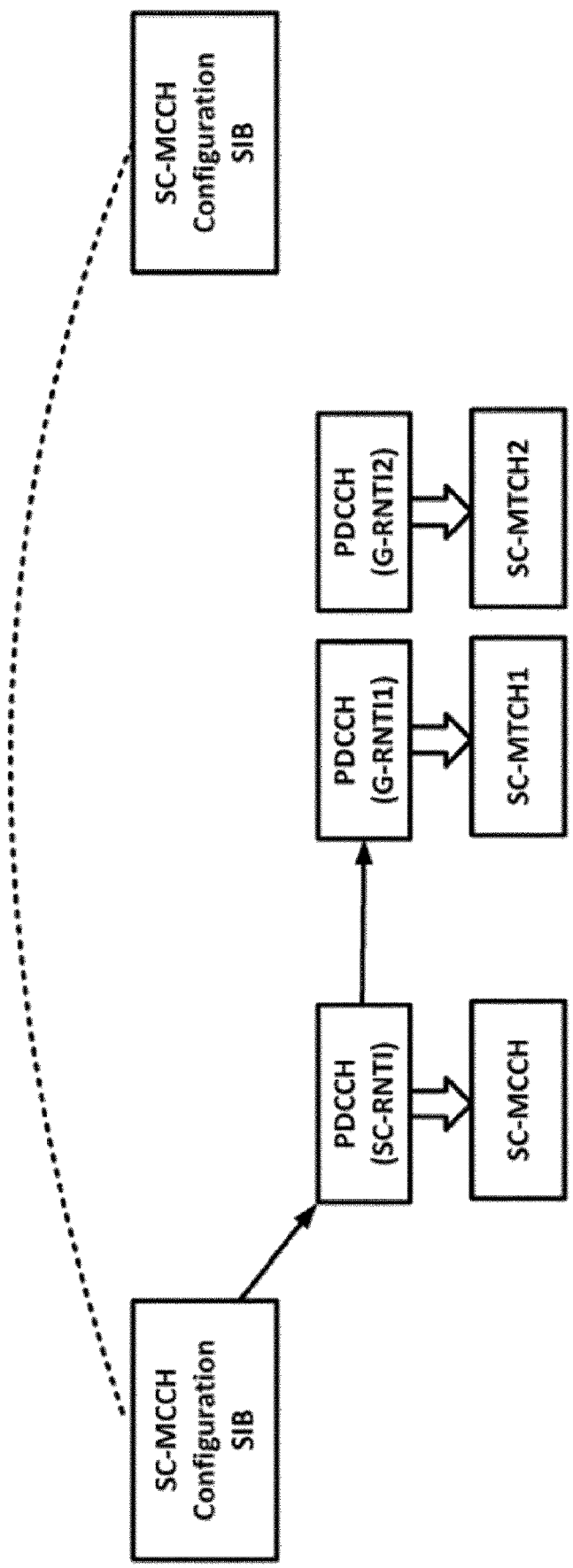
FIG. 17 shows an example process according to some aspects of one or more exemplary embodiments of the present disclosure.

In some examples as shown in FIG. 17, to receive single cell point to multi-point transmissions, a UE may receive one or more of: MBS broadcast control information, for example received using a broadcast channel (e.g., a system information block (SIB)), a multicast control channel (e.g., a single cell multicast control channel (SC-MCCH)), and a multicast traffic channel (e.g., a single cell multicast traffic channel (SC-MTCH)). For example, the MBS broadcast control information (e.g., transmitted via a SIB) may indicate how to receive the multicast control channel (e.g., the SC-MCCH) that carries MBS related control information. The multicast control channel may indicate available MBS service identifiers (e.g., Temporary Mobile Group Identities (TMGIs)) and how to receive the multicast traffic channel (e.g., SCMTCH). The multicast control channel may further indicate RAN identifiers (such as group radio network temporary identifiers (G-RNTIs)) associated with the MBS service identifiers (e.g., TMGIs). For example, the multicast control channel may indicate mappings between the TMGIs and the G-RNTIs. The information carried by the multicast control channel may remain unchanged within a modification period and may change based on the modification period. The multicast control channel information may be repeated, within a modification period, based on a repetition period. The MBS broadcast control information may indicate the modification period and/or the repetition period. The multicast traffic channel may be used to transfer data of an MBS service. The Multicast control channel (e.g., SC-MCCH) may carry a message (e.g., a SCPTM Configuration message) comprising configuration parameters for receiving the MBS data via the MBS traffic channel. The configuration parameters may indicate ongoing MBS sessions and information on which each session may be scheduled. The configuration parameters may include a neighbor cell list for potential neighbors providing a same Temporary Mobile Group Identity (TMGI).

In some examples, a UE may initially discover and subscribe to MBS services through application layer signaling or by other means e.g. pre-provisioning in the device. Such service discovery signaling/provisioning may provide the UE with some service identifiers for the subscribed MBS services. In some examples, a service identifier may be a Temporary Mobile Group Identity (TMGI).

In some examples, when a UE in RRC_CONNECTED state receives a PDSCH carrying MBS data, the UE may feedback an ACK for receiving PDSCH successfully or a NACK for not receiving PDSCH successfully in form of uplink control information (UCI). The UE may determine a PUCCH resource set according to the size of UCI information. In some examples, by using a PUCCH resource indicator field of a DCI that schedules the PDSCH carrying MBS data, the UE may determine a PUCCH resource from the resource set. In some examples, the gNB may perform unicast based retransmissions based on the feedbacks on each UE's PUCCH resource, or the gNB may perform a multicast-based retransmission if the gNB receives at least one NACK feedback.

In some examples, multiple UEs may share a common NACK resource for HARQ feedback of MBS data. With NACK only feedback mode, a UE may feedback NACK if the UE does not receive the corresponding MBS PDSCH successfully, and the UE may not provide feedback otherwise. In some examples, the gNB may configure a PUCCH resource which only carries NACK. In some examples, when a gNB receives at least one NACK feedback at the NACK resource, e.g., based on energy detection, the gNB may perform a multicast-based retransmission.

In some examples, both HARQ ACK and HARQ NACK feedback may be used. In some examples UEs may send only NACK for example using a shared PUCCH resource.

In some examples, a UE-specific ACK/NACK mechanism may be used. A UE may send ACK if a packet is correctly received, or NACK if incorrectly received. Each UE has a separate resource to transmit ACK/NACK.

In some examples, a Group NACK mechanism may be used. A UE may send NACK if packet is incorrectly received and may not provide feedback if a packet is correctly received. Multiple UEs may share the same resource to transmit NACK.

In some examples, autonomous/blind retransmission with no feedback or with feedback for aggregated PDSCH may be used. The transmitter may retransmit the data autonomously without waiting for feedback or bundled feedback for aggregated set of PDSCH for same TB.

In some examples, multicast retransmission based on group NACK may be used. The transmitter may retransmit the data if there is a NACK from at least one UE which could not decode the data successfully.

In some examples, retransmission may be multicast or unicast based on UE-specific ACK/NACK feedback. The transmitter may retransmit the data by using G-RNTI PDSCH or C-RNTI PDSCH, e.g., based on the number of UEs that failed to receive the initial transmission.

In some examples, CSI (e.g., CQI, PMI, RI, RSRP/RSRQ, SINR, SRI, CRI, interference condition) feedback may improve performance through adaptive link adaptation in a changing communication environment or to assist the management/operation of UE grouping.

In some examples, a UE receiving PTM transmission may have its own UL resource to send corresponding HARQ feedback. In some examples, the PUCCH resource for PTM HARQ feedback may be dedicated for PTM HARQ feedback.

In some examples, a PUCCH resource may be shared by PTM HARQ feedback and PTP HARQ feedback.

In some examples, a UE may use separate HARQ feedback codebooks for PTM and PTP transmission.

In some examples, a HARQ feedback codebook may comprise HARQ feedback for both PTM and PTP transmissions.

In some examples, CSI feedback (e.g., CQI/PMI/RI) may be used to improve PTM transmission reliability with higher resource efficiency. With CSI feedback, gNB can know the rough direction of the UE and what is the right MCS to be used. In some examples, PTM specific CSI-RS with different scrambling ID compared to PTP CSI-RS may be configured and the UE may measure and report PTM specific channel related information. In some examples, UEs in a PTM group may be configured with one or more CSI-RS for PTM and with corresponding CSI reporting configurations.

In some examples, UE's feedback, such as positive acknowledgement or negative acknowledgement (e.g., HARQ positive/negative acknowledgement or higher layer (such as RLC and/or PDCP) positive/negative acknowledgement) may improve reliability for receiving Multicast and Broadcast Service (MBS) services.

In some examples, MBS services may be provided using point-to-multipoint (PTM) transmission in a cell. The Physical Downlink Shared Channel (PDSCH) of a cell may be used to transmit multicast/broadcast data and control information by a base station to a group of UEs. For example, data of an MBS service may be transmitted via the PDSCH and using a first RNTI (e.g., a group-specific Radio Network Temporary Identifier (G-RNTI)), and the control information may be transmitted via the PDSCH using a second RNTI (e.g., a single-cell point-to-multipoint (SC-PTM) Radio Network Temporary Identifier (SC-RNTI)). In some examples, by using the HARQ mechanism and by transmitting the HARQ and CSI feedback, the reliability of the MBS services may be enhanced.

In some examples, a wide range of MBS use cases may be used including MBS services, Mission Critical Communications, Internet of Things (IoT), and Vehicle-to-everything (V2X), etc. Some MBS use cases may involve transmissions of periodic or aperiodic traffic with low to high data rates targeted toward few to thousands of UEs within a cell. In some examples, reliability requirements may vary by MBS use case and/or deployment scenario. The UE feedback mechanisms (e.g., for HARQ based retransmission or CSI feedback) may vary based on MBS use case and/or deployment scenario.

In some examples, the retransmission may be at PDCP and/or RLC sublayers. The RLC and/or PDCP retransmissions may be sufficient for some use cases and the PHY/MAC based retransmissions (e.g., HARQ based retransmission) may not be required. In some examples, the RLC and/or PDCP retransmissions may not meet the required latency and efficiency for some of the MBS use cases. In some examples, there may be a need to support HARQ for MBS transmission. In some examples, a UE may report CSI feedback to improve the efficiency and reliability of MBS transmissions. In some examples, a UE and a base station may support HARQ for MBS transmission on PDSCH and a UE may transmit HARQ feedback (e.g., HARQ ACK/NAK) and CSI feedback to the base station to enhance the reliability and efficiency of the MBS services.

Figure 18:
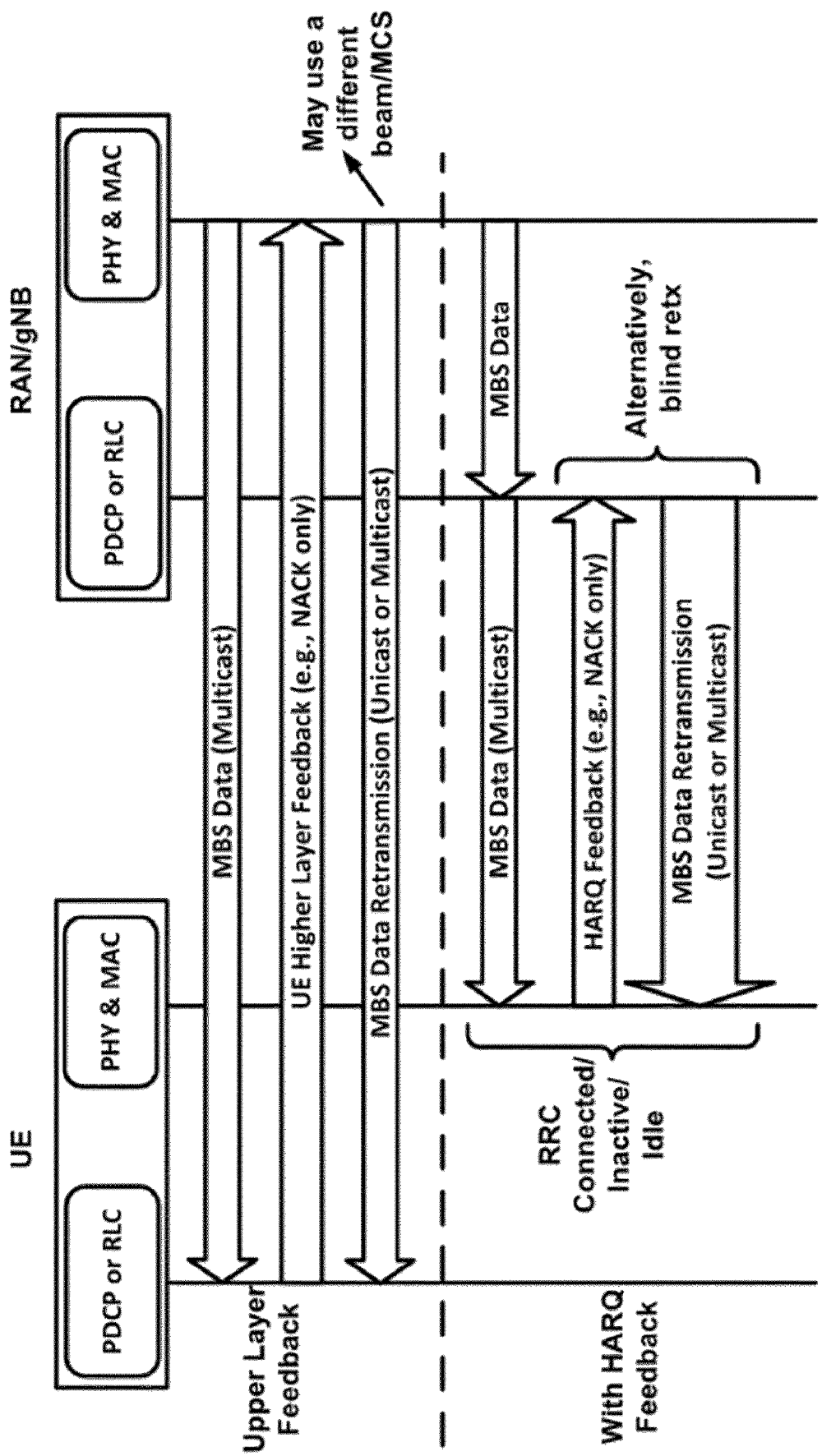
FIG. 18 shows an example process according to some aspects of one or more exemplary embodiments of the present disclosure.

Example retransmission mechanisms with retransmission at PDCP/RLC or at the MAC/PHY (e.g., HARQ based retransmissions) are shown in FIG. 18. In an example retransmission mechanism, a UE may support blind retransmission of MTCH data with resources scheduled/configured based on MCCH. The UE may not transmit HARQ feedback and may use few retransmissions which may be configured based on upper layer retransmission, e.g. PDCP or RLC retransmission. In an example retransmission mechanism, a UE may support synchronous HARQ retransmission based on UE feedback. The resources for retransmissions may be pre-determined/pre-configured at the time of first transmission and the resources for the retransmission may be used if needed based the UE feedback. In some examples, the synchronous HARQ retransmission may be used by UEs in RRC connected state. In some examples, the synchronous HARQ retransmission may be used by UEs in RRC connected, inactive or idle states and may enhance power efficiency as resource used by possible retransmissions may be preconfigured and be used by UE without extra PDCCH monitoring for a scheduling resources for the retransmission. In an example retransmission mechanism, asynchronous HARQ with incremental redundancy (IR) may be used, where a retransmission may be dynamically scheduled using a downlink control information (e.g., like unicast). This process may be more spectrum efficient. A UE that has not received the earlier transmissions may monitor the PDCCH until receiving the retransmitted packets. In some examples, a UE may use one or more of the above retransmission mechanisms.

In some examples, if the RAN receives negative acknowledgement (NACK) from only a few and/or known UEs, the RAN may retransmit that data through unicast to such UEs, otherwise the re-transmission may be multicast, in which case UEs who have already received the data may ignore such re-transmissions. In some examples, with synchronous HARQ retransmission, a UE may identify and avoid re-transmission of already received MBS transport blocks.

In some examples, when a UE is configured with HARQ feedback for MBS data, the configuration of such HARQ feedback across UEs may take into account the service range and number of UEs as well as the trade-offs between QoS/reliability requirement for the MBS service and UEs' power saving and signaling overhead.

In some examples, a variety of MBS services may be available for a UE. Some of the MBS services may involve long term transmission of periodic traffic. In some examples, the MBS service may be delivered to UEs in all RRC states. In some examples, UE's in RRC idle/inactive states may transmit their feedback to the network to trigger data retransmission if needed. The UEs in RRC idle and inactive states may receive MBS data and if configured provide feedback to the network.

Figure 19:
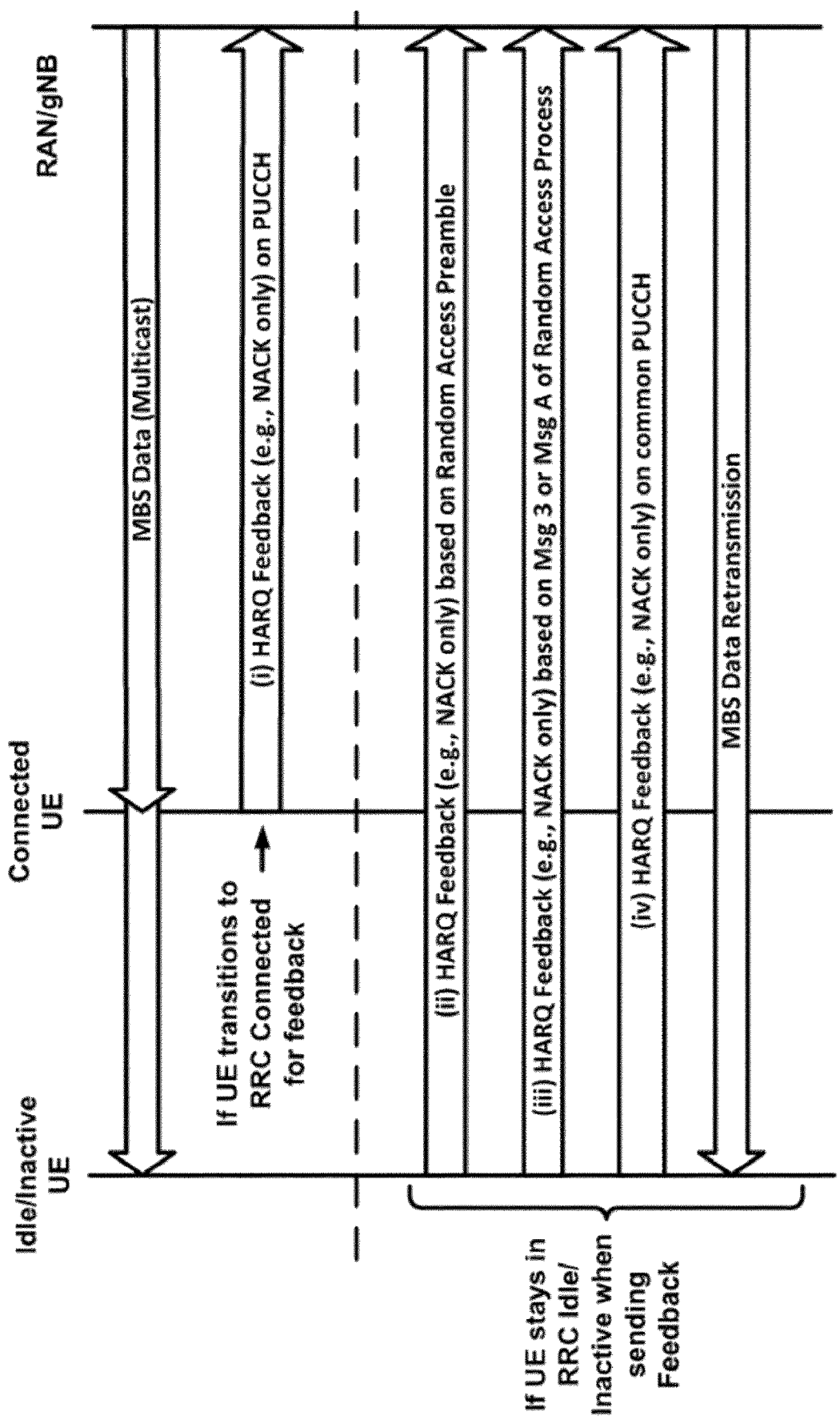
FIG. 19 shows an example process according to some aspects of one or more exemplary embodiments of the present disclosure.

In some examples, a UE may provide higher layer, e.g. PDCP/RLC feedback for MBS data delivery if configured by network. In some examples, UEs may be configured to provide higher layer, e.g. PDCP/RLC, feedback for MBS data delivery issues. In some examples, a UE may provide HARQ feedback on MBS data when the UE is one of various defined RRC states. For example, the UE may be in an RRC Idle state or an RRC Inactive state and may provide HARQ feedback if configured by the network. In some examples, a UE may provide HARQ Feedback for MBS data if configured by the network. Example options (i), (ii), (iii) and (iv) for HARQ feedback in connected, idle and inactive states are shown in FIG. 19. In some example, UEs in all RRC states including idle/Inactive may be configured to provide HARQ feedback. In some examples, UEs may transition to RRC connected State to provide HARQ feedback (e.g., option (i) in FIG. 19).

In some examples, HARQ feedback from UE's in RRC Idle/Inactive may be supported. In an example, UEs in RRC Idle or Inactive may return to RRC Connected to send their negative feedback on MBS data reception. In an example, UEs in RRC Idle or Inactive may send the HARQ feedback without retuning to RRC Connected state (e.g., options (ii), (iii) and (iv) in FIG. 19). In some examples, for MBS HARQ, the RAN may configure UEs in RRC Idle or Inactive to send the HARQ feedback without retuning to RRC Connected state. For example, for a UE in RRC Idle and Inactive state, the UE may use PRACH to convey HARQ NACK to the RAN and the PRACH resources may be reserved to allow contention free access. In some examples, some common PUCCH resources may be configured to be used by such UEs to send their feedback. In some example, UEs in RRC Idle or Inactive states may use contention free RACH to send the HARQ NACK for a given MBS service. The NACK for one or multiple MBS services may be sent via a payload in selected or designated message based on a specific RACH implementation. For example, in accordance with a two-step RACH implementation, the NACK may be included as a payload in a Message A. In another example, in accordance with a four-step RACH implementation, the NACK may be included as a payload in a Message 3. In some examples, the RAN may configure different preambles codes associated to different MBS services as part of MBS configuration and the UE may indicate its NACK for an MBS service by sending the PRACH with corresponding preamble. In some examples, the UEs in Idle or Inactive states may be configured with common PUCCH resources to send NACK feedback and UE's in connected state may reuse and share their PUCCH for unicast services for sending their MBS feedback.

In some examples, the number of UEs receiving MBS may be large and the network may need to limit the amount of feedback it receives. In some examples, HARQ feedback transmission from UE for MBS may be limited to transmission of NACKs based on network/RRC configuration. For example, the UE may receive configuration parameters indicating whether the HARQ feedback may be transmitted for NACK only or for both ACK and NACK.

In some examples, HARQ feedback transmission from UE for MBS may be limited to UEs within a configured distance from the base station or based on a threshold on received reference signal received power (RSRP) level.

In some examples, CSI feedback may be transmitted by UEs to optimize MCS level and MIMO configuration of MBS data. In some examples, CSI feedback may be UE-specifically configured, and the network may request CSI feedback from a subset of UE and at certain times.

In some examples, the network may indicate the CSI-RS resources for the UE to measure for MBS data and the configured CSI-RS resources may be different than those used for unicast, e.g. MBS data may not be beam-formed or may have wider beam than unicast data transmitted to different UES within the MBS group. In the absence of such configuration or Quasi-CoLocation (QCL) information, the UE may assume the MSB data is transmitted collocated with SSBs.

In some examples, the RAN may indicate the CSI-RS resources/port for a UE to measure for CSI feedback. Such indication may be sent as unicast RRC message to UEs directed to send CSI feedback or be included in the common MBS configuration available to all UEs.

In some examples, UEs may send their CSI feedback, based for MBS data, when they are in RRC Connected state.

In some examples, given the natures of MBS data transmission the periodic CSI feedback may have limited use and may require some multiplexing and design consideration in PUCCH configuration. In some examples, MBS CSI feedback may be based on DCI triggered aperiodic CSI feedback.

In some examples, the network may direct UEs to send their CSI feedback using a common set of PUCCH resources or based on message 3/A of 4/2-Step RACH using one of designated PRACH resources. In some examples, the subset of UEs to send CSI feedback may be selected randomly using a randomization seed and/or based on their received signal from the base station. In some examples, the RAN may determine to change transmission parameters based on CSI feedbacks. The CSI feedback may be spread over time window, so different UEs may send their feedback at different times may use the randomization seed.

Figure 20:
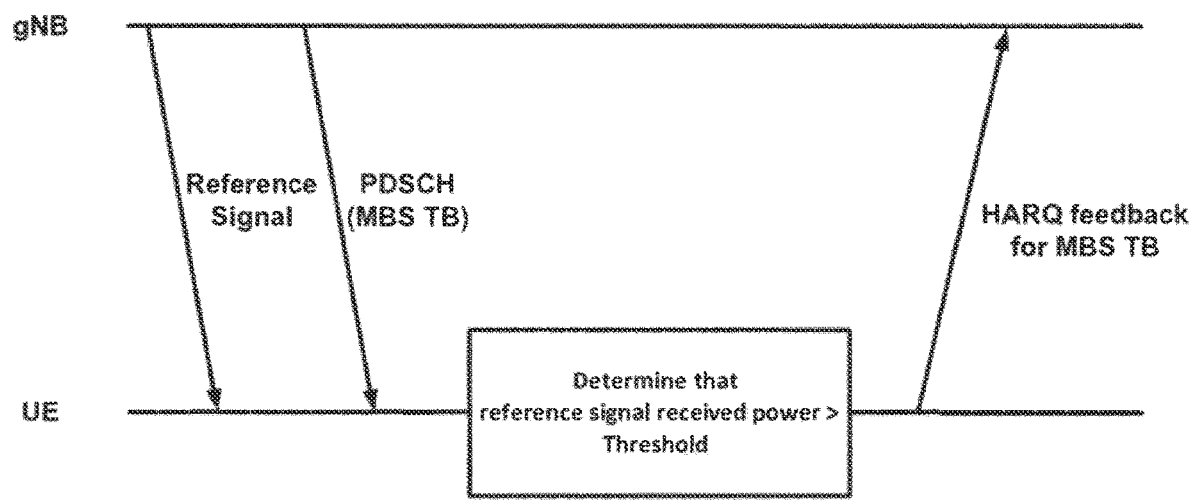
FIG. 20 shows an example process according to some aspects of one or more exemplary embodiments of the present disclosure.

In an example embodiment as shown in FIG. 20, a UE may receive one or more messages (e.g., RRC messages) comprising configuration parameters. The configuration parameters may comprise configuration parameters of reference signals. The configuration parameters of the reference signals may indicate radio resources of the reference signals. In some examples, the UE may receive a dedicated RRC message comprising the configuration parameters of the reference signals. In some examples, the UE may receive a broadcast message (e.g., a SIB message) comprising the configuration parameters of the reference signals. In some examples, the reference signals may comprise channel state information reference signals (CSI-RSs). In some example, the reference signals may comprise synchronization signal (SSB) reference signals.

The UE may measure the reference signals based on the configuration parameters of the reference signals (e.g., measure the radio resources indicated by the reference signals). The reference signals may be used, by the UE, for determining whether to transmit a HARQ feedback or not to transmit a HARQ feedback. In an example, the reference signals may be used, by the UE, for determining whether to transmit a HARQ feedback or not to transmit a HARQ feedback for received transport blocks associated with a service type (e.g., a multicast and broadcast service (MBS) service type). The UE may measure the reference signals and may determine a received power level associated with the reference signals (e.g., a reference signal received power (RSRP) of the reference signals). The UE may determine whether the reference signal received power (RSRP) of the reference signal is above/larger than a threshold or not. The UE may determine, based on the reference signal measurement, that the reference signal received power is above/larger than the threshold. In some examples example, the threshold may have a predetermined value. In some examples, the UE may receive one or more configuration parameters indicating the threshold. In an example, the UE may be in an RRC idle state or an RRC inactive state. The UE may receive a broadcast message (e.g., a SIB) comprising the one or more configuration parameters indicating the threshold. In an example, the UE may be in an RRC Connected state. The UE may receive an RRC message comprising the one or more configuration parameters indicating the threshold.

The UE may receive a downlink data channel (e.g., a PDSCH) carrying a downlink transport block. The downlink transport block may be an MBS transport block. The UE may receive the downlink MBS transport block via a traffic channel associated with the MBS services (e.g., a multicast traffic channel (MTCH) logical channel). For example, the UE may receive control information (e.g., via a control channel such as multicast control channel (MCCH)) indicating scheduling information for the MBS transport block and may receive the downlink MBS transport block using the scheduling the scheduling information indicated by the control information.

The UE may determine whether the received downlink MBS transport block is received successfully or not. The UE may determine whether to transmit a HARQ feedback associated with the downlink MBS transport block based on comparing the reference signal received power and the threshold. For example, based on the reference signal received power being larger than the threshold, the UE may determine to transit the HARQ feedback associated with the received downlink MBS transport block. For example, the UE may determine to transit the HARQ feedback associated with the received downlink MBS transport block based on the reference signal received power being larger than the threshold and based on the HARQ feedback being a negative acknowledgement. For example, the UE may transmit the HARQ feedback only if the reference signal received power is larger than the threshold and the HARQ feedback is NACK. The UE may transmit the HARQ feedback associated with the downlink transport block via an uplink control channel. In some examples, the uplink control channel may be specific to MBS services. In some examples, the uplink control channel may be shared between the MBS data and the unicast data. In some examples, based on the transmission of the HARQ feedback, the UE may receive a retransmission of the downlink MBS transport block.

Figure 21:
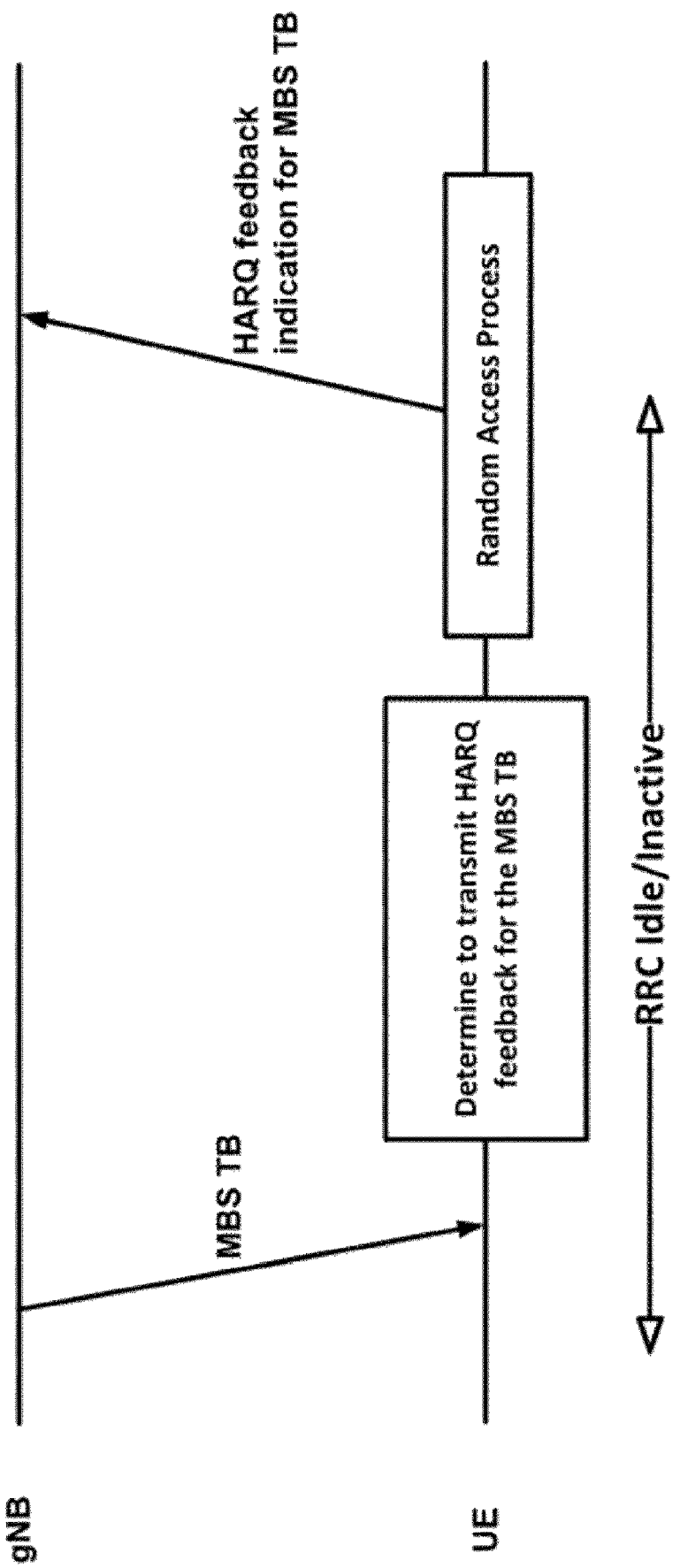
FIG. 21 shows an example process according to some aspects of one or more exemplary embodiments of the present disclosure.

In an example embodiment as shown in FIG. 21, a UE may be in designated state, such as an RRC inactive state or an RRC idle state. The UE may receive an MBS transport block while in the RRC inactive state or the RRC idle state. For example, the UE may receive the downlink MBS transport block using radio resources scheduled by control information associated with MBS services (e.g., control information carried by a multicast control channel (e.g., MCCH)). The UE may determine whether the downlink MBS transport block is received correctly or not (e.g., using a decoding process and/or based on error detection using a cyclic redundancy check (CRC) code). The UE may determine to transmit a HARQ feedback for the MBS transport block. For example, the UE may determine to transmit the HARQ feedback based on the HARQ feedback being a negative acknowledgement. For example, the UE may determine to transmit the HARQ feedback based on the HARQ feedback being a negative acknowledgement and based on comparing the received power level of a reference signal with a threshold. Based on the determination to transmit the HARQ feedback for the transport block and based on the UE being in the RRC idle or RRC inactive state, the UE may transmit the HARQ feedback or may transmit an indication of the HARQ feedback using a random access process (e.g., a two-step random access process or a four-step random access process). For example, one or more messages of the random access process may be used for transmitting the HARQ feedback or the indication of the HARQ feedback.

In some examples the UE may transition to an RRC connected state based on the random access process.

In some example, the UE may remain in the RRC inactive state or the RRC idle state (e.g., the RRC state of the UE before the indication of the HARQ feedback via the random access process) after or before the completion of the random access process and after the transmission of the HARQ feedback or the indication of the HARQ feedback.

In some examples, the UE may transition from the RRC inactive state or the RRC idle state (e.g., the RRC state of the UE before the indication of the HARQ feedback via the random access process) to an RRC connected state based on the random access process (e.g., after the completion of the random access process). The UE may transmit the HARQ feedback, associated with the MBS transport block, via an uplink control channel after transitioning to the RRC connected state. For example, the UE may receive configuration parameters of the uplink control channel via a message 4 (in a four-step random access process) or a message B (in a two-step random access process).

In some examples, the UE may transmit a random access preamble to start the random access process. The random access preamble may indicate the HARQ feedback. For example, one or more first random access preambles may be configured/pre-configured as negative acknowledgement (NACK). For example, one or more first random access preambles may be configured/pre-configured as negative acknowledgement (NACK) and one or more second random access preambles may be configured/pre-configured as positive acknowledgement (ACK). The base station may determine the HARQ feedback for the UE based on the random access preamble used in the random access process. For example, the UE may receive configuration parameters indicating which preambles are used for ACK or NACK indication via a broadcast message (e.g., a SIB) or via dedicated RRC signaling indicating that the one or more first random access preambles may be used to indicate a NACK and/or that the one or more second random access preambles may be used to indicate an ACK.

In some examples, a random access preamble used for the random access process may indicate that the initiation of the random access process may be for providing a HARQ feedback.

In some examples, the indication of the HARQ feedback may be based on a message 3 of a four-step random access process. For example, a payload of the message 3 may indicate the HARQ feedback.

In some examples, the indication of the HARQ feedback may be based on a message A of a two-step random access process. For example, a payload of the message A may indicate the HARQ feedback.

Figure 22:
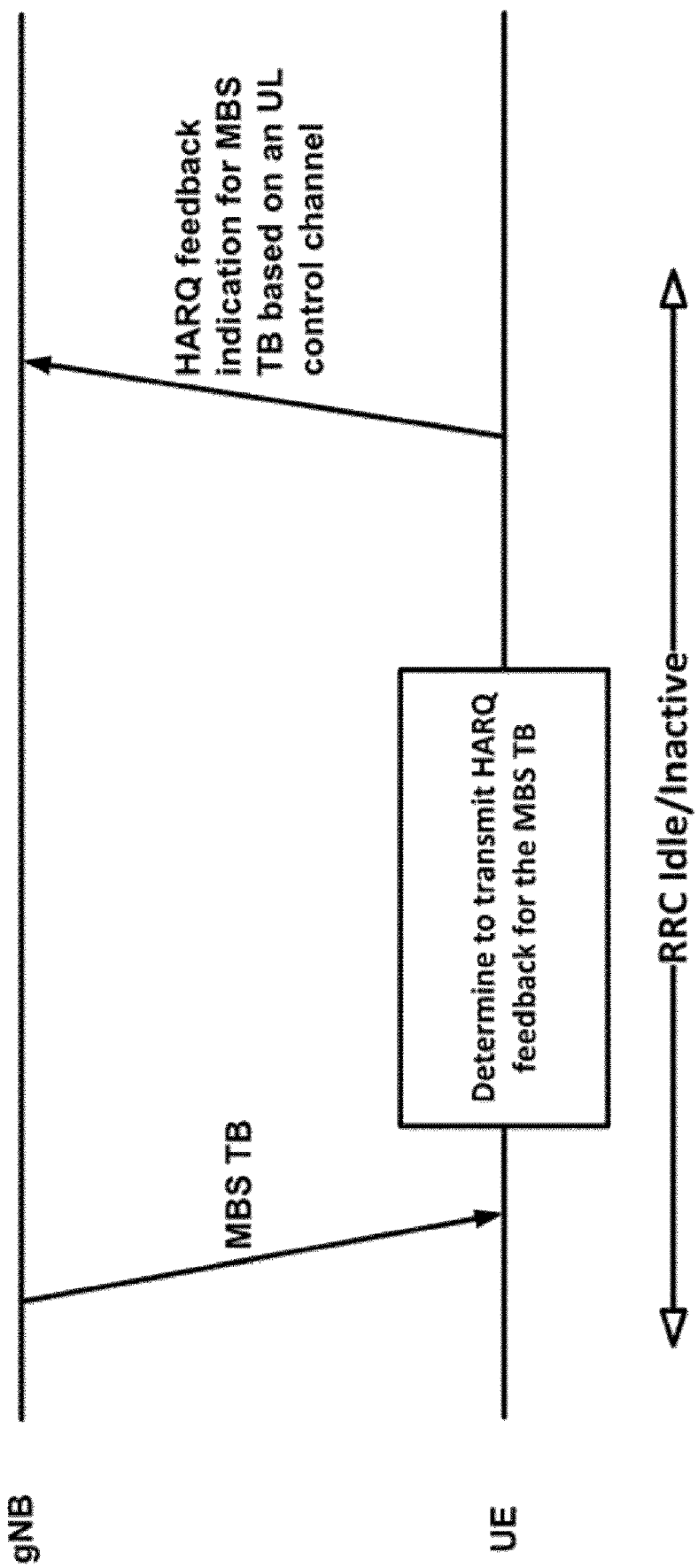
FIG. 22 shows an example process according to some aspects of one or more exemplary embodiments of the present disclosure.

In an example embodiment as shown in FIG. 22, based on the determination to transmit the HARQ feedback for the transport block and based on the UE being in the RRC idle or RRC inactive state, the UE may transmit the HARQ feedback or may transmit an indication of the HARQ feedback using an uplink control channel. The UE may transmit the HARQ feedback or may transmit an indication of the HARQ feedback using an uplink control channel while remaining the RRC idle state or the RRC inactive state. The uplink control channel may be commonly configured for a group of UEs (e.g., for a group of UEs in RRC idle state and/or RRC inactive state). In some examples, the UE may receive the configuration parameters of the uplink control channel via a broadcast message (e.g., a SIB). The configuration parameters may indicate radio resources of the uplink control channel.

Figure 23:
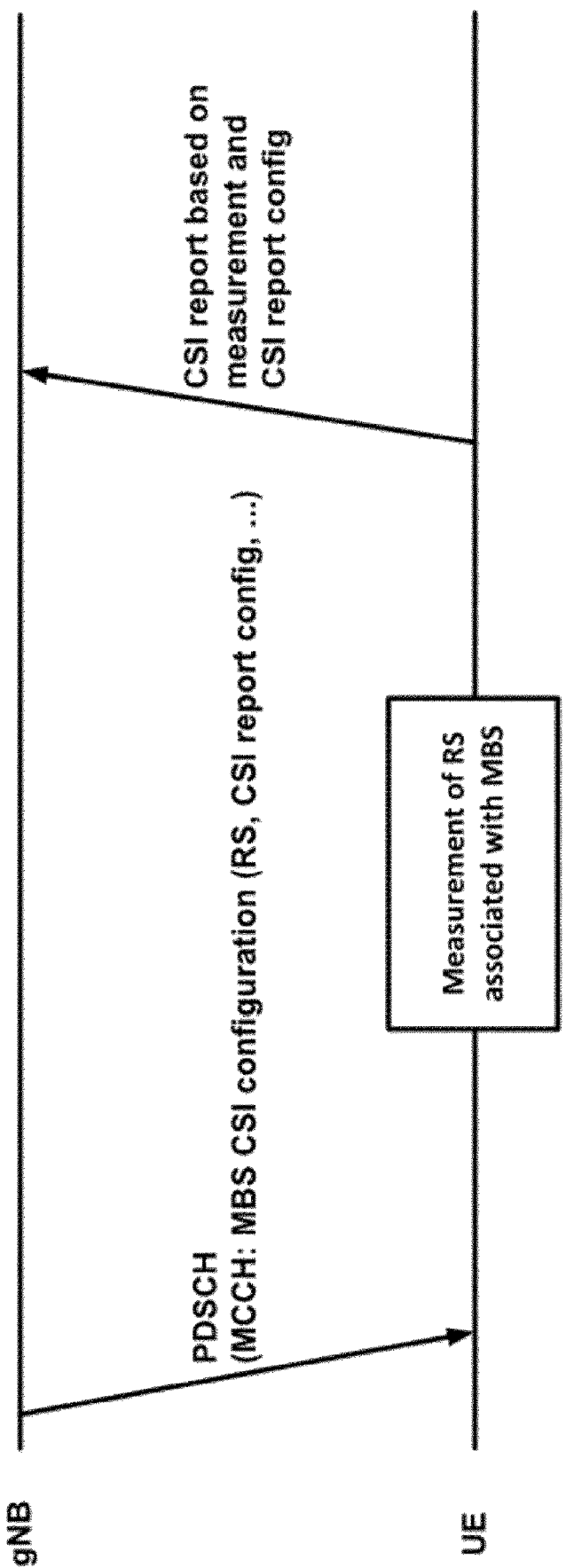
FIG. 23 shows an example process according to some aspects of one or more exemplary embodiments of the present disclosure.

In an example embodiment as shown in FIG. 23, a UE may receive a logical control channel (e.g., a multicast control channel (MCCH)) associated with MBS services. The UE may receive the logical control channel via a physical downlink data channel (e.g., a PDSCH). The downlink data channel associated with the MBS services may be associated with a first RNTI (e.g., a SC-RNTI). In some examples, the UE may receive scheduling information for reception of the downlink data channel used for transmission of the logical control channel, for example based on one or more broadcast messages (e.g., a SIB message). The logical control channel may carry control information for receiving MBS services. For example, the control information may comprise CSI configuration parameters associated with the MBS services. The CSI configuration parameters may comprise parameters for CSI measurement and CSI reporting. For example, the CSI configuration parameters may indicate radio resources for CSI measurement and CSI reports. The CSI reports may be associated with the MBS services and may be used by the base station for scheduling and transmission of the MBS data. The UE may measure one or more reference signals based on the CSI configuration parameters indicated by the CSI configuration parameters (e.g., carried by the MCCH). The UE may transmit CSI reports based on the CSI measurements and based on the CSI configuration parameters (e.g., carried by the MCCH). In an example, the UE may transmit the CSI report based on a DCI indicating a request/trigger for transmission of the CSI report (e.g., an aperiodic CSI report) or based on radio resources for periodic CSI reports (e.g., as configured by the CSI configuration parameters).

Figure 24:
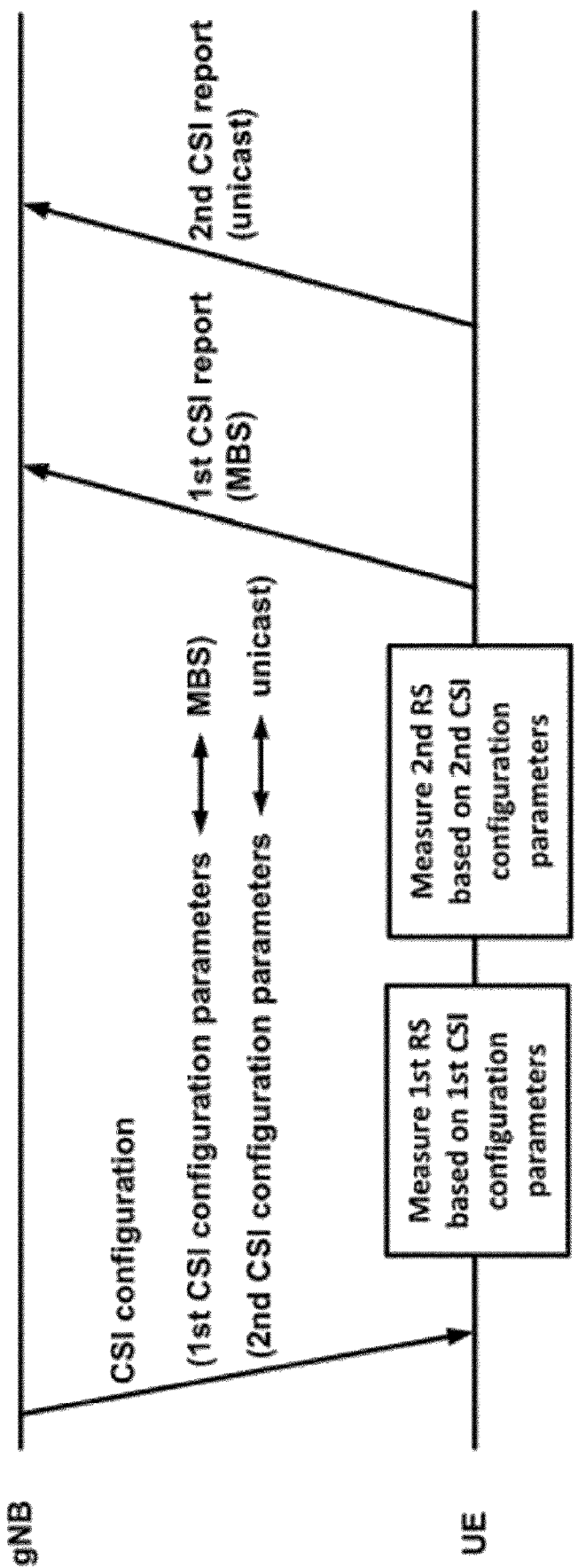
FIG. 24 shows an example process according to some aspects of one or more exemplary embodiments of the present disclosure.

In an example embodiment as shown in FIG. 24, a UE may receive one or more messages (e.g., one or more RRC messages, one or more broadcast messages, etc.) comprising CSI configuration parameters. The CSI configuration parameters may comprise first CSI configuration parameters for measuring first CSI reference signals and/or reporting first CSI reports associated with MBS services. The CSI configuration parameters may comprise second CSI configuration parameters for measuring second CSI reference signals and/or reporting second CSI reports associated with one or more unicast services. The UE may measure one or more first reference signals based on the first CSI configuration parameters. For example, the first CSI configuration parameters may indicate first radio resources of the one or more first reference signals and the UE may measure the one or more first reference signals by measuring the first radio resources. The UE may measure one or more second reference signals based on the second CSI configuration parameters. For example, the second CSI configuration parameters may indicate second radio resources of the one or more second reference signals and the UE may measure the one or more second reference signals by measuring the second radio resources. The UE may generate a first CSI report, associated with one or more MBS services, based on the measurement of the one or more first reference signals. The UE may generate a second CSI report, associated with one or more unicast services, based on the measurement of the one or more second reference signals. In some examples, the transmission of the first CSI report and/or the transmission of the second CSI report may be based on reception of one or more DCIs indicating the request/triggering for transmission of the first CSI report and/or the transmission of the second CSI report. For example, the CSI request fields of the one or more DCIs may indicate the request/trigger for transmission of the first CSI report and/or the transmission of the second CSI report. In some examples, the transmission of the first CSI report and/or the transmission of the second CSI report may be based on periodic CSI reporting. For example, the first CSI configuration parameters or the second CSI configuration parameters may indicate radio resources of the first CSI report or the second CSI report.

In an embodiment, a user equipment (UE) may determine that a received power level of a reference signal is larger than a threshold. The UE may receive, via a downlink data channel and from a base station, a multicast broadcast services (MBS) transport block. The UE may transmit to the base station a HARQ feedback associated with the MBS transport block based on the received power level of the reference signal being larger than the threshold.

In some embodiments, the UE may receive a retransmission of the MBS transport block based on the HARQ feedback being a negative acknowledgement.

In some embodiments, the transmitting the HARQ feedback associated with the transport block may further be based on the HARQ feedback being a negative acknowledgement.

In some embodiments, the user equipment (UE) may be in a radio resource control (RRC) connected state.

In some embodiments, the user equipment (UE) may be in one of a radio resource control (RRC) inactive state and RRC idle state.

In some embodiments, the UE may receive configuration parameters indicating radio resources of the reference signal. The UE may measure reference signal using the configuration parameters. In some embodiments, the receiving the configuration parameters may be via one of a broadcast message and a radio resource control (RRC) dedicated message. In some embodiments, the broadcast message may be a system information block (SIB) message.

In some embodiments, the UE may receive a configuration parameter indicating the threshold. In some embodiments, the receiving the configuration parameter may be via one of a broadcast message and a radio resource control (RRC) dedicated message. In some embodiments, the broadcast message may be a system information block (SIB) message.

In an embodiment, a user equipment (UE) may receive in a radio resource control (RRC) inactive state or an RRC idle state, a multicast broadcast services (MBS) transport block. The UE may determine to transmit a HARQ feedback for the received MBS transport block. Based on the determination and based on the UE being in the RRC inactive state or the RRC idle state, the UE may transmit an indication of the HARQ feedback using a random access process.

In some embodiments, the UE may transition, using the random access process, from the RRC inactive state or the RRC idle state to an RRC connected state. The UE may transmit the HARQ feedback for the MBS transport block after transitioning to the RRC connected state. The UE may transmit the HARQ feedback after transitioning to the RRC connected state via an uplink control channel.

In some embodiments, the random access process may comprise transmitting a random access preamble, wherein the random access preamble may indicate the HARQ feedback. In some embodiments, the user equipment (UE) may remain in the radio resource control (RRC) inactive state or the RRC idle state after transmitting the random access preamble.

In some embodiments, the UE may receive configuration parameters indicating that one or more first random access preambles are for a negative acknowledgement. In some embodiments, the UE may receive configuration parameters indicating that one or more second random access preambles are for a positive acknowledgement. In some embodiments, the UE may receive a broadcast message comprising the configuration parameters. In some embodiments, the broadcast message may be a system information block (SIB) message.

In some embodiments, the random access process may be a two-step random access process. The transmission of the indication of the HARQ feedback may be based on a message A of the random access process.

In some embodiments, the random access process may be a four-step random access process. The transmission of the indication of the HARQ feedback may be based on a message 3 of the random access process.

In some embodiments, the user equipment (UE) may remain in the radio resource control (RRC) inactive state or the RRC idle state after the transmission of the indication of the HARQ feedback.

In some embodiments the random access process may comprise transmitting a random access preamble indicating that the random access process is for providing a HARQ feedback.

In some embodiments, the HARQ feedback may be a negative acknowledgement.

In some embodiment, the determining to transmit a HARQ feedback for the received MBS transport block may be based on the HARQ feedback being a negative acknowledgement.

In an embodiment, a UE in a radio resource control (RRC) inactive state or an RRC idle state may receive a multicast broadcast services (MBS) transport block. The UE may determine to transmit a HARQ feedback for the received MBS transport block. Based on the determination and based on the UE being in the RRC inactive state or the RRC idle state, the UE may transmit an indication of the HARQ feedback using an uplink control channel, wherein the uplink control channel may be a common uplink control channel for a plurality of UEs in the RRC inactive state or the RRC idle state.

In some embodiments, the UE may receive one or more broadcast messages comprising configuration parameters of the uplink control channel. In some embodiments, the one or more broadcast messages may comprise a system information block (SIB) message. In some embodiments, the configuration parameters may indicate the radio resources of the uplink control channel.

In some embodiments, the HARQ feedback may be a negative acknowledgement.

In some embodiments, the determining to transmit a HARQ feedback for the received MBS transport block may be based on the HARQ feedback being a negative acknowledgement.

In some embodiments, the transmitting the indication of the HARQ feedback may be while remaining in the RRC inactive state or the RRC idle state.

In an embodiment, a UE may receive, via a downlink data channel, a logical control channel associated with multicast broadcast services (MBS) services, wherein: the logical control channel may carry control information comprising CSI configuration parameters for CSI measurement and CSI reports; and the CSI reports may be associated with the MBS services. The UE may measure one or more reference signals based on the CSI configuration parameters. The UE may transmit a CSI report based on the measurement of the reference signals and based on the CSI configuration parameters.

In some embodiments, the logical control channel may be a logical multicast control channel (MCCH). In some embodiments, the UE may receive scheduling information for reception of the MCCH.

In some embodiments, the control information may further comprise scheduling information for reception of multicast broadcast services (MBS).

In some embodiments, the channel state information (CSI) configuration parameters may indicate radio resources of the one or more reference signals.

In some embodiments, the UE may receive a downlink control information indicating a request for transmission of the channel state information (CSI) report.

In some embodiments, the UE may transmit the channel state information (CSI) report based on a periodic CSI resource. The CSI configuration parameters may indicate the periodic CSI report.

In an embodiment, a user equipment (UE), may receive CSI configuration parameters comprising: first CSI configuration parameters associated with multicast broadcast services (MBS) services; and second CSI configuration parameters associated with unicast services. The UE may measure one or more first reference signals based on the first CSI configuration parameters. The UE may measure one or more second reference signals based on the second CSI configuration parameters. The UE may transmit a first CSI report, associated with one or more MBS services, based on the measurement of the first reference signals. The UE may transmit a second CSI report, associated with one or more unicast services, based on the measurement of the second reference signals.

In some embodiments, the first channel state information (CSI) configuration parameters may indicate first radio resources of the one or more first reference signals; and the second CSI configuration parameters may indicate second radio resources of the one or more second reference signals.

In some embodiments, the UE may receive a first downlink control information indicating a first request for transmission of the first CSI report; and the UE may receive a second downlink control information indicating a second request for transmission of the second CSI report.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of hybrid automatic repeat request (HARQ) feedback transmission, comprising:
receiving, by a user equipment (UE), via a downlink data channel, a multicast broadcast services (MBS) transport block;
determining, by the UE, that a received power level of a reference signal is larger than a predetermined threshold; and
transmitting, by the UE, a HARQ feedback associated with the received MBS transport block.

Clause 2. The method of Clause 1, wherein the HARQ feedback corresponds to a negative acknowledgement.

Clause 3. The method of Clause 2 further comprising receiving a retransmission of the MBS transport block responsive to the HARQ feedback.

Clause 4. The method of Clause 1, wherein a state of the user equipment (UE) corresponds to a radio resource control (RRC) connected state.

Clause 5. The method of Clause 1, wherein a state of the user equipment (UE) corresponds to at least one of a radio resource control (RRC) inactive state and RRC idle state.

Clause 6. The method of Clause 1 further comprising:
receiving configuration parameters indicating radio resources of the reference signal; and
measuring the reference signal using the configuration parameters.

Clause 7. The method of Clause 6, wherein receiving the configuration parameters includes receiving the configuration parameters via one of a broadcast message and a radio resource control (RRC) dedicated message.

Clause 8. The method of Clause 7, wherein the broadcast message is a system information block (SIB) message.

Clause 9. The method of Clause 1 further comprising receiving a configuration parameter including the predetermined threshold.

Clause 10. The method of Clause 9, wherein receiving the configuration parameter includes receiving the configuration parameters via one of a broadcast message and a radio resource control (RRC) dedicated message.

Clause 11. The method of Clause 10, wherein the broadcast message is a system information block (SIB) message.

Clause 12. A method of hybrid automatic repeat request (HARQ) feedback transmission comprising:
receiving, by a user equipment (UE) a multicast broadcast services (MBS) transport block, wherein the UE corresponds to a defined state;
determining to transmit a HARQ feedback for the received MBS transport block; and based on the UE being in the defined state, transmitting the HARQ feedback using a random access process.

Clause 13. The method of Clause 12 further comprising:
transitioning, using the random access process, to an RRC connected state; and
transmitting the HARQ feedback for the MBS transport block after transitioning to the RRC connected state.

Clause 14. The method of Clause 13, wherein the transmitting the HARQ feedback includes transmitting the HARQ feedback via an uplink control channel.

Clause 15. The method of Clause 12, wherein transmitting the HARQ feedback using a random access process includes transmitting a random access preamble, wherein the random access preamble corresponds to the HARQ feedback.

Clause 16. The method of Clause 15, wherein the user equipment (UE) remains in the defined state after transmitting the random access preamble.

Clause 17. The method of Clause 12 further comprising receiving, by the UE, configuration parameters.

Clause 18. The method of Clause 17, wherein receiving, by the UE the configuration includes receiving configuration parameters indicating that one or more first random access preambles are for a negative acknowledgement.

Clause 19. The method of Clause 17, wherein receiving, by the UE, configuration parameters includes receiving configuration parameters indicating that one or more second random access preambles are for a positive acknowledgement.

Clause 20. The method of Clause 17, wherein receiving by the UE configuration parameters includes receiving a broadcast message comprising the configuration parameters.

Clause 21. The method of Clause 20, wherein the broadcast message is a system information block (SIB) message.

Clause 22. The method of Clause 12, wherein the random access process is a two-step random access process.

Clause 23. The method of Clause 22, wherein the transmission of the indication of the hybrid automatic repeat request (HARQ) feedback is based on a message A of the two-step random access process.

Clause 24. The method of Clause 12, wherein the random access process is a four-step random access process.

Clause 25. The method of Clause 24, wherein the transmission of the indication of the hybrid automatic repeat request (HARQ) feedback is based on a message 3 of the four-step random access process.

Clause 26. The method of Clause 12, wherein the defined state include at least one of a radio resource control (RRC) inactive state or the RRC idle state.

Clause 27. The method of Clause 12, wherein the hybrid automatic repeat request (HARQ) feedback includes a negative acknowledgement.

Clause 28. The method of Clause 12, wherein determining to transmit the HARQ feedback for the received multicast transport services (MBS) transport block is based on the HARQ feedback being a negative acknowledgement.

Clause 29. A method of hybrid automatic repeat request (HARQ) feedback transmission comprising:
receiving, by a user equipment (UE) in a defined radio resource control (RRC) state, a multicast broadcast services (MBS) transport block;
determining to transmit a HARQ feedback for the received MBS transport block; and
based on the UE being in the defined state, transmitting an indication of the HARQ feedback using an uplink control channel, wherein the uplink control channel is a common uplink control channel for use by a plurality of UEs in defined state.

Clause 30. The method of Clause 29 further comprising receiving, by the user equipment (UE), one or more broadcast messages comprising configuration parameters of the uplink control channel.

Clause 31. The method of Clause 30, wherein the one or more broadcast messages comprise a system information block (SIB) message.

Clause 32. The method of Clause 28, wherein the configuration parameters indicate the radio resources of the uplink control channel.

Clause 33. The method of Clause 29, wherein HARQ feedback includes a negative acknowledgement.

Clause 34. The method of Clause 29, wherein determining to transmit a HARQ feedback for the received MBS transport block includes determining to transmit the HARQ feedback when the HARQ feedback includes a negative acknowledgement.

Clause 35. The method of Clause 29, wherein transmitting the indication of the HARQ feedback occurs while the UE remains in the defined state.

Clause 36. A method of channel state information (CSI) feedback reporting comprising:
receiving, via a downlink data channel, a logical control channel associated with multicast broadcast services (MBS) services, wherein:
the logical control channel carries control information comprising CSI configuration parameters for CSI measurement and CSI reports; and
the CSI reports are associated with the MBS services;
measuring one or more reference signals based on the CSI configuration parameters; and
transmitting a CSI report based on the measurement of the reference signals and based on the CSI configuration parameters.

Clause 37. The method of Clause 36, wherein the logical control channel is a logical multicast control channel (MCCH).

Clause 38. The method of Clause 37 further comprising receiving scheduling information for reception of the logical multicast control channel (MCCH).

Clause 39. The method of Clause 36, wherein the control information further comprises scheduling information for reception of multicast broadcast services (MBS).

Clause 40. The method of Clause 36, wherein channel state information (CSI) configuration parameters indicate radio resources of the one or more reference signals.

Clause 41. The method of Clause 36 further comprising the user equipment (UE) receiving a downlink control information indicating a request for transmission of the channel state information (CSI) report.

Clause 42. The method of Clause 36, wherein transmitting the channel state information (CSI) report includes transmitting the CSI report based on a periodic CSI resource and wherein the CSI configuration parameters include the periodic CSI resource.

Clause 43. A method of channel state information (CSI) feedback reporting, comprising:

receiving, by a user equipment (UE), CSI configuration parameters comprising:

first CSI configuration parameters associated with multicast broadcast services (MBS) services; and second CSI configuration parameters associated with unicast services;

measuring one or more first reference signals based on the first CSI configuration parameters;

measuring one or more second reference signals based on the second CSI configuration parameters;

transmitting a first CSI report, associated with one or more MBS services, based on the measurement of the first reference signals; and transmitting a second CSI report, associated with one or more unicast services, based on the measurement of the second reference signals.

Clause 44. The method of Clause 43, wherein:

the first channel state information (CSI) configuration parameters indicate first radio resources of the one or more first reference signals; and the second CSI configuration parameters indicate second radio resources of the one or more second reference signals.

Clause 45. The method of Clause 43 further comprising:

receiving, by the user equipment (UE), a first downlink control information indicating a first request for transmission of the first channel state information (CSI) report; and receiving a second downlink control information indicating a second request for transmission of the second CSI report.

Clause 46. An apparatus for utilization in wireless communications comprising:

an antenna for use in transmission of electromagnetic signals;

a memory for maintaining computer-readable code; and a processor for executing the computer-readable code that causes the apparatus to receive a multicast broadcast services (MBS) transport block, wherein the UE corresponds to a defined state;

determine to transmit a HARQ feedback for the received MBS transport block; and based on the UE being in the defined state, transmit the HARQ feedback using a random access process.

Clause 47. The apparatus of Clause 46, wherein the apparatus is further configure to:

transition, using the random access process, to an RRC connected state; and transmit the HARQ feedback for the MBS transport block after transitioning to the RRC connected state.

Clause 48. The apparatus of Clause 47, wherein the apparatus transmits the HARQ feedback via an uplink control channel.

Clause 49. The apparatus of Clause 46, wherein the apparatus transmits a random access preamble, wherein the random access preamble corresponds to the HARQ feedback.

Clause 50. The apparatus of Clause 49, wherein the apparatus remains in the defined state after transmitting the random access preamble.

Clause 51. The apparatus of Clause 46, wherein the apparatus receives configuration parameters.

Clause 52 The apparatus of Clause 51, wherein the configuration parameters indicate that one or more first random access preambles are for a negative acknowledgement.

Clause 53. The apparatus of Clause 51, wherein the configuration parameter indicate that one or more second random access preambles are for a positive acknowledgement.

Clause 54. The apparatus of Clause 51, wherein the apparatus receives a broadcast message comprising the configuration parameters.

Clause 55. The apparatus of Clause 54, wherein the broadcast message is a system information block (SIB) message.

Clause 56. The apparatus of Clause 46, wherein the random access process is a two-step random access process.

Clause 57. The apparatus of Clause 56, wherein the transmission of the indication of the hybrid automatic repeat request (HARQ) feedback is based on a message A of the two-step random access process.

Clause 58. The apparatus of Clause 46, wherein the random access process is a four-step random access process.

Clause 59. The apparatus of Clause 46, wherein the transmission of the indication of the hybrid automatic repeat request (HARQ) feedback is based on a message 3 of the four-step random access process.

Clause 60. The apparatus of Clause 46, wherein the defined state include at least one of a radio resource control (RRC) inactive state or the RRC idle state.

Clause 61. The apparatus of Clause 46, wherein the HARQ feedback includes a negative acknowledgement.

Clause 62. The apparatus of Clause 46, wherein the apparatus transmits the HARQ feedback for the received multicast transport services (MBS) transport block is based on the HARQ feedback being a negative acknowledgement.

Clause 63. An apparatus for utilization in wireless communications comprising:
an antenna for use in transmission of electromagnetic signals;
a memory for maintaining computer-readable code; and
a processor for executing the computer-readable code that causes the apparatus to:
receive, via a downlink data channel, a logical control channel associated with multicast broadcast services (MBS) services, wherein the logical control channel carries control information comprising CSI configuration parameters for CSI measurement and CSI reports and wherein the CSI reports are associated with the MBS services;
measure one or more reference signals based on the CSI configuration parameters; and
transmit a CSI report based on the measurement of the reference signals and based on the CSI configuration parameters.

Clause 64. The apparatus of Clause 63, wherein the logical control channel is a logical multicast control channel (MCCH).

Clause 65. The apparatus of Clause 63, wherein the apparatus receives scheduling information for reception of the logical multicast control channel (MCCH).

Clause 66. The apparatus of Clause 63, wherein the control information further comprises scheduling information for reception of multicast broadcast services (MBS).

Clause 67. The apparatus of Clause 63, wherein channel state information (CSI) configuration parameters indicate radio resources of the one or more reference signals.

Clause 68. The apparatus of Clause 63, wherein the apparatus receives a downlink control information indicating a request for transmission of the channel state information (CSI) report.

Clause 69. The apparatus of Clause 63, wherein the apparatus transmits the CSI report based on a periodic CSI resource and wherein the CSI configuration parameters include the periodic CSI resource.

Clause 70. The method of Clause 43, further comprising receiving, by the UE, a downlink control information indicating a request for transmission of at least one of the first CSI report or the second CSI report.

Clause 71. The method of Clause 43, further comprising:
generating, by the UE, the first CSI report and the second CSI report.

Clause 72. A base station for a mobile communication system, the base station comprising:
a memory storing instructions; and
a processor configured to execute the instructions to:
transmit, to a user equipment (UE), channel state information (CSI) configuration parameters comprising:
first CSI configuration parameters associated with multicast broadcast services (MBS); and
second CSI configuration parameters associated with unicast services;
wherein the UE is configured to measure one or more first reference signals based on the first CSI configuration parameters and measure one or more second reference signals based on the second CSI configuration parameters.

Clause 73 The base station of Clause 72, wherein the processor is configured to execute the instructions to: transmit a downlink control information indicating a request for transmission of at least one of a first CSI report or a second CSI report.

Clause 74 The base station of Clause 72, wherein the downlink control information triggers the UE to generate at least one of the first CSI report or the second CSI report.

Clause 75 A method of hybrid automatic repeat request (HARQ) feedback reception, comprising:
transmitting, by a base station, via a downlink data channel, a multicast broadcast services (MBS) transport block;
receiving, by the base station, a HARQ feedback associated with the transmitted MBS transport block.

Clause 76 A method of hybrid automatic repeat request (HARQ) feedback reception, comprising:
transmitting, by a base station, a multicast broadcast services (MBS) transport block, which is enable to be received by a user equipment (UE) corresponding to a defined state;
receiving a HARQ feedback for the MBS transport block transmitted based on the UE being in the defined state, wherein the MBS transport block is transmitted by transmitting the HARQ feedback using a random access process.

Clause 77 A method of hybrid automatic repeat request (HARQ) feedback reception, comprising:
transmitting, by a base station, a multicast broadcast services (MBS) transport block, which is enable to receive by a user equipment (UE) in a defined radio resource control (RRC) state;
receiving an indication of the HARQ feedback using an uplink control channel, wherein the indication is transmitted based on the UE being in the defined state, and wherein the uplink control channel is a common uplink control channel for use by a plurality of UEs.

Clause 78 A method of channel state information (CSI) feedback reception, comprising:
transmitting, by a base station and via a downlink data channel, a logical control channel associated with multicast broadcast services (MBS), wherein the logical control channel carries control information including CSI configuration parameters for CSI measurement and CSI reports, and wherein the CSI reports are associated with the MBS,
transmitting one or more reference signals; and
receiving a CSI report based on measurement of at least one of the one or more reference signals and based on the CSI configuration parameters.

Clause 79 A method of channel state information (CSI) feedback reception, comprising:
transmitting, by a base station, CSI configuration parameters including:
first CSI configuration parameters associated with multicast broadcast services (MBS); and
second CSI configuration parameters associated with unicast services;
transmitting one or more first reference signals based on the first CSI configuration parameters;
transmitting one or more second reference signals based on the second CSI configuration parameters;
receiving a first CSI report, associated with one or more MBS, based on measurement of at least one of the one or more first reference signals; and
receiving a second CSI report, associated with one or more unicast services, based on measurement of at least one of the one or more second reference signals.

This application claims the benefit of U.S. Provisional Application No. 63/090,409, entitled "FEEDBACK ENHANCEMENT FOR MULTICAST BROADCAST SERVICES," and filed on Oct. 12, 2020. U.S. Provisional Application No. 63/090,409 is incorporated by reference herein.

The invention claimed is:

1. A method of hybrid automatic repeat request (HARQ) feedback transmission, comprising:
   receiving, by a user equipment (UE), from a base station via a downlink data channel, multicast broadcast services (MBS) data;
   receiving, by the UE from the base station, prior to receiving the MBS data, first information for determining whether to transmit HARQ feedback for the MBS data;
   determining, by the UE, whether to transmit the HARQ feedback for the MBS data based on the first information; and
   transmitting, by the UE, the HARQ feedback for the MBS data according to the determination.

2. The method of claim 1, wherein the HARQ feedback corresponds to a negative acknowledgement (NACK).

3. The method of claim 2, further comprising receiving a retransmission of the MBS data responsive to the HARQ feedback.

4. The method of claim 1, wherein a state of the UE corresponds to a radio resource control (RRC) connected state.

5. The method of claim 1, wherein a state of the UE corresponds to at least one of a radio resource control (RRC) inactive state and an RRC idle state.

6. The method of claim 1, further comprising:
   receiving second information indicating whether the HARQ feedback for the MBS data is transmitted for a NACK only or for both an acknowledgment (ACK) and a NACK; and
   determining whether to transmit the HARQ feedback for the NACK only or for both the ACK and the NACK based on the second information.

7. The method of claim 6, wherein receiving the second information includes receiving the second information via one of a broadcast message and an RRC dedicated message.

8. A user equipment (UE), comprising:
   a receiving circuitry configured to receive, from a base station via a downlink data channel, multicast broadcast services (MBS) data, wherein the receiving circuitry is configured to receive, from the base station, prior to receiving the MBS data, first information for determining whether to transmit hybrid automatic repeat request (HARQ) feedback for the MBS data;
   a determining circuitry configured to determine whether to transmit the HARQ feedback for the MBS data based on the first information; and
   a transmitting circuitry configured to transmit the HARQ feedback for the MBS data based on the determination.

9. A method for a hybrid automatic repeat request (HARQ) feedback reception, comprising:
   transmitting, by a base station to a user equipment (UE) via a downlink data channel, multicast broadcast services (MBS) data;
   transmitting, by the base station to the UE, prior to transmitting the MBS data, first information for the UE to determine whether to transmit HARQ feedback for the MBS data; and
   receiving, by the base station from the UE, the HARQ feedback for the MBS data based on the first information.

10. A base station, comprising:
   a transmitting circuitry configured to transmit, to a user equipment (UE) via a downlink data channel, multicast broadcast services (MBS) data, wherein the transmitting circuitry is configured to transmit, to the UE, prior to transmitting the MBS data, first information for the UE to determine whether to transmit hybrid automatic repeat request (HARQ) feedback for the MBS data; and
   a receiving circuitry configured to receive, from the UE, the HARQ feedback for the MBS data based on the first information.

* * * * *